United States Patent
Yokoyama et al.

(10) Patent No.: US 9,819,916 B2
(45) Date of Patent: Nov. 14, 2017

(54) MOVABLE APPARATUS, IMAGE GENERATION APPARATAUS, AND IMAGE PROJECTION APPARATUS

(71) Applicants: Naoya Yokoyama, Kanagawa (JP); Akihisa Mikawa, Kanagawa (JP)

(72) Inventors: Naoya Yokoyama, Kanagawa (JP); Akihisa Mikawa, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/376,898

(22) Filed: Dec. 13, 2016

(65) Prior Publication Data

US 2017/0187996 A1   Jun. 29, 2017

(30) Foreign Application Priority Data

Dec. 25, 2015 (JP) .................................. 2015-254451
Oct. 21, 2016 (JP) .................................. 2016-206942

(51) Int. Cl.
*H04N 5/64* (2006.01)
*H04N 9/31* (2006.01)

(52) U.S. Cl.
CPC ........... *H04N 9/3144* (2013.01); *H04N 9/315* (2013.01)

(58) Field of Classification Search
CPC .............................. H04N 9/3144; H04N 9/315
USPC ................................................. 348/748, 744
See application file for complete search history.

(56) References Cited

U.S. PATENT DOCUMENTS

| | | | |
|---|---|---|---|
| 7,389,519 B2 | 6/2008 | Yamanaka et al. | |
| 7,639,933 B2 | 12/2009 | Seo et al. | |
| 8,167,433 B2 | 5/2012 | He | |
| 8,446,672 B2 | 5/2013 | Omi | |
| 9,213,223 B2 | 12/2015 | Mashitani | |
| 9,253,431 B2 | 2/2016 | Tani et al. | |
| 9,354,494 B2 | 5/2016 | Mashitani et al. | |
| 2005/0193576 A1* | 9/2005 | Hollman | G01R 31/2891 33/286 |
| 2016/0154294 A1 | 6/2016 | Fujioka et al. | |
| 2016/0198134 A1 | 7/2016 | Mikawa et al. | |
| 2016/0259255 A1* | 9/2016 | Aoki | G03F 7/70716 |
| 2016/0277716 A1 | 9/2016 | Mikawa et al. | |

FOREIGN PATENT DOCUMENTS

| | | |
|---|---|---|
| JP | 2001-350196 | 12/2001 |
| JP | 2004-180011 | 6/2004 |
| JP | 2008-070494 | 3/2008 |
| JP | 2008-292647 | 12/2008 |

(Continued)

*Primary Examiner* — Michael Lee
(74) *Attorney, Agent, or Firm* — Ipusa, PLLC

(57) ABSTRACT

A movable apparatus is provided. The movable apparatus includes a fixed unit including a first fixed plate and a second fixed plate made of magnetic material; a movable unit including a movable plate movably supported between the first fixed plate and the second fixed plate and a movable part fixed to the movable plate, the second fixed plate being sandwiched between the movable plate and the movable part; a first pair configured to form a drive force generation mechanism; and a second pair configured to form a position detection mechanism. The second pair is arranged facing each other in the fixed unit and in the movable plate, and the first pair is arranged facing each other in the fixed unit and in the movable part.

11 Claims, 25 Drawing Sheets

(56) References Cited

FOREIGN PATENT DOCUMENTS

| | | |
|---|---|---|
| JP | 2012-181386 | 9/2012 |
| JP | 5084308 | 11/2012 |
| JP | 2013-117629 | 6/2013 |
| JP | 5365314 | 12/2013 |
| JP | 5381450 | 1/2014 |
| JP | 2015-165294 | 9/2015 |
| JP | 2015-194721 | 11/2015 |
| JP | 2016-085363 | 5/2016 |
| JP | 2016-102945 | 6/2016 |
| JP | 2016-102946 | 6/2016 |
| JP | 2016-126250 | 7/2016 |
| JP | 2016-177283 | 10/2016 |
| NO | 2016/067519 | 5/2016 |

\* cited by examiner

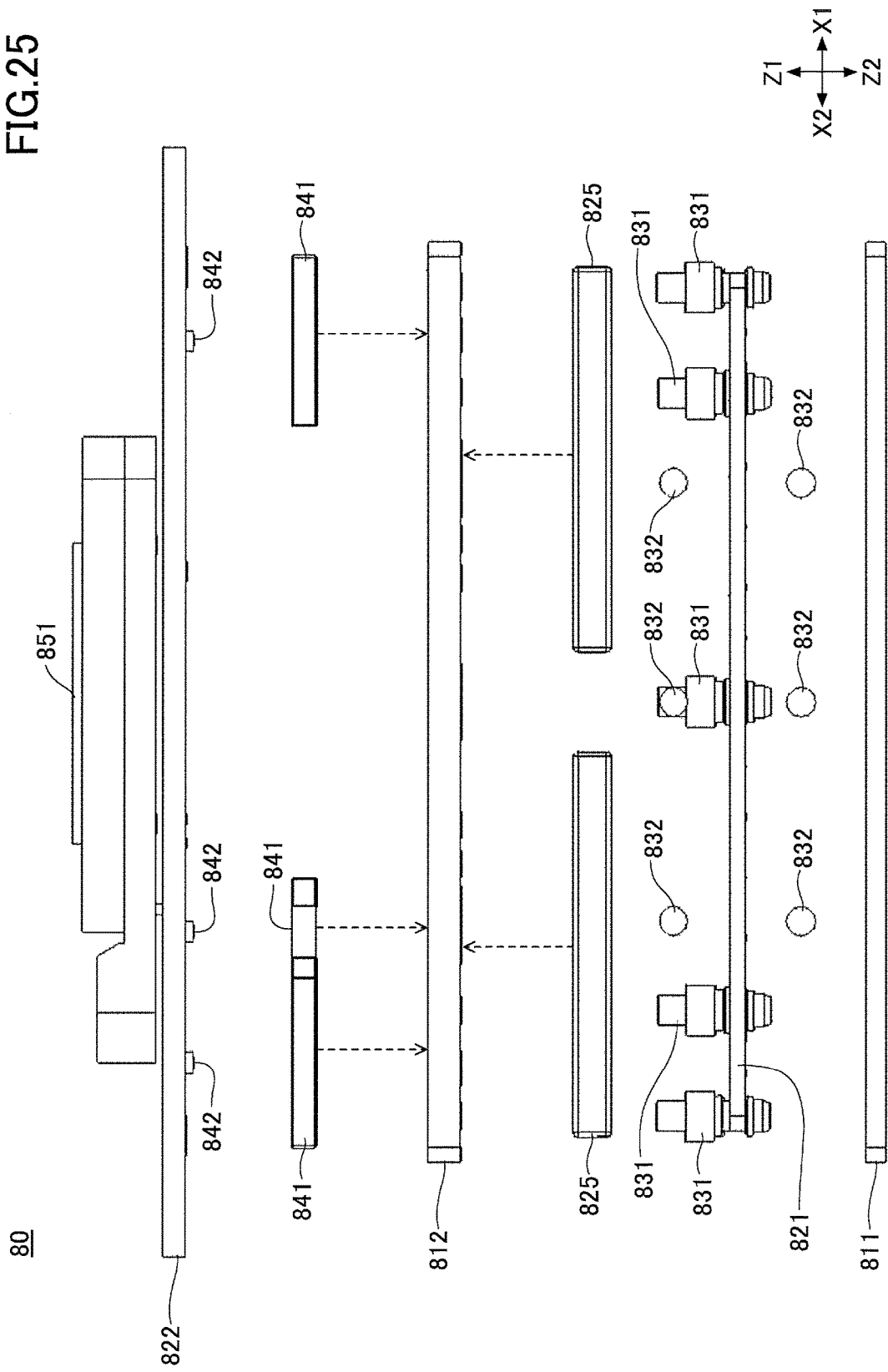

MOVABLE APPARATUS, IMAGE GENERATION APPARATAUS, AND IMAGE PROJECTION APPARATUS

BACKGROUND OF THE INVENTION

1. Field of the Invention

The present invention relates to a movable apparatus, an image generation apparatus, and an image projection apparatus.

2. Description of the Related Art

In an image projection apparatus for projecting an image on a screen or the like based on input image data, a method is known in which image quality is improved by slightly shifting the projection image with high speed. A pseudo high resolution of the projection image is achieved by the high speed shifting.

For example, an image display apparatus is known that is capable of displaying an image with higher resolution than that of a display element by having pixels shifted by shifting optical axes of light beams emitted from the plurality of pixels of the display element by using pixel shift means (refer to, for example, PLT 1).

CITATION LIST

Patent Literature

[PTL 1] Japanese Unexamined Patent Application Publication No. 2004-180011

SUMMARY OF THE INVENTION

A movable apparatus is provided. The movable apparatus includes a fixed unit including a first fixed plate and a second fixed plate made of magnetic material; a movable unit including a movable plate movably supported between the first fixed plate and the second fixed plate and a movable part fixed to the movable plate, the second fixed plate being sandwiched between the movable plate and the movable part; a first pair configured to form a drive force generation mechanism; and a second pair configured to form a position detection mechanism. The second pair is arranged facing each other in the fixed unit and in the movable plate, and the first pair is arranged facing each other in the fixed unit and in the movable part.

According to an embodiment of the present invention, a movable apparatus, an image generation apparatus, and an image projection apparatus are provided that is capable of accurately detecting a position shifting with high speed.

BRIEF DESCRIPTION OF THE DRAWINGS

FIG. 25 is an exploded side view illustrating the image generation unit.

DETAILED DESCRIPTION OF THE PREFERRED EMBODIMENTS

In the following, embodiments of the present invention will be described while making reference to the drawings. In each of the drawings, the same numeral is assigned to the same element and a duplicated description may be omitted.

A method is considered for shifting a projection image in which an image generation unit for generating a projection image is shifted with high speed. In this case, for example, it is possible to shift a substrate on which the image generation unit is mounted with high speed by using a magnetic actuator including a magnet and a coil. Further, for example, it is possible to detect a position of the image generation unit and control the generated image, etc., by having a small sized Hall element capable of accurate position detection disposed at a position facing the magnet of the magnetic actuator.

However, when the above-described magnetic actuator and the Hall element are used, the position detection accuracy may be degraded because the Hall element is influenced by magnetic fields of the magnetic actuator.

In view of the above-described problem, the present invention has been made. It is an object of the present invention to provide a movable apparatus, an image generation apparatus, and an image projection apparatus that are capable of detecting with high accuracy a position shifting with high speed.

First Embodiment

<Configuration of Image Projection Apparatus>

Figure 1:
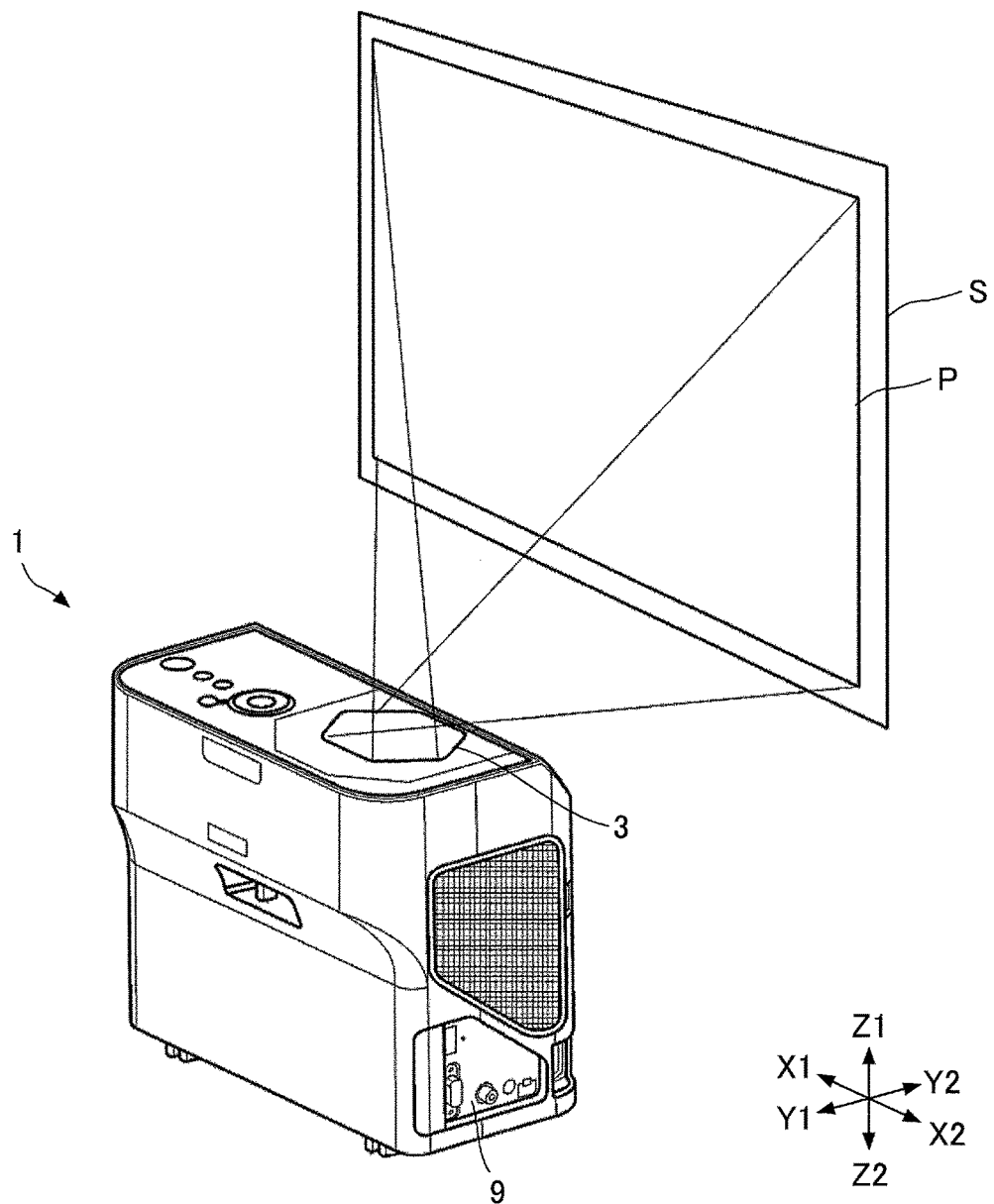
FIG. 1 is a drawing illustrating an image projection apparatus according to a first embodiment.

FIG. 1 is a drawing illustrating a projector 1 according to a first embodiment.

As shown in FIG. 1, the projector 1 includes a radiation window 3 and an external interface (I/F) 9, and an optical engine that is configured to generate a projection image is provided in the inside of the projector 1. The projector 1 is an example of an image projection apparatus. For example, when image data is transmitted to the projector 1 from a personal computer (PC) or a digital camera connected to the external interface 9, the optical engine generates an image based on the received image data and projects the image P from the radiation window 3 onto a screen S as shown in FIG. 1.

Note that, in the following drawings, X1-X2 directions represent width directions of the projector 1, Y1-Y2 directions represent height directions of the projector 1, and Z1-Z2 directions represent depth directions of the projector 1. Moreover, in the following description, it is assumed that the radiation window 3 side of the projector 1 corresponds to the top of the projector 1 and the side of the projector 1 opposite to the radiation window 3 corresponds to the bottom of the projector 1.

Figure 2:
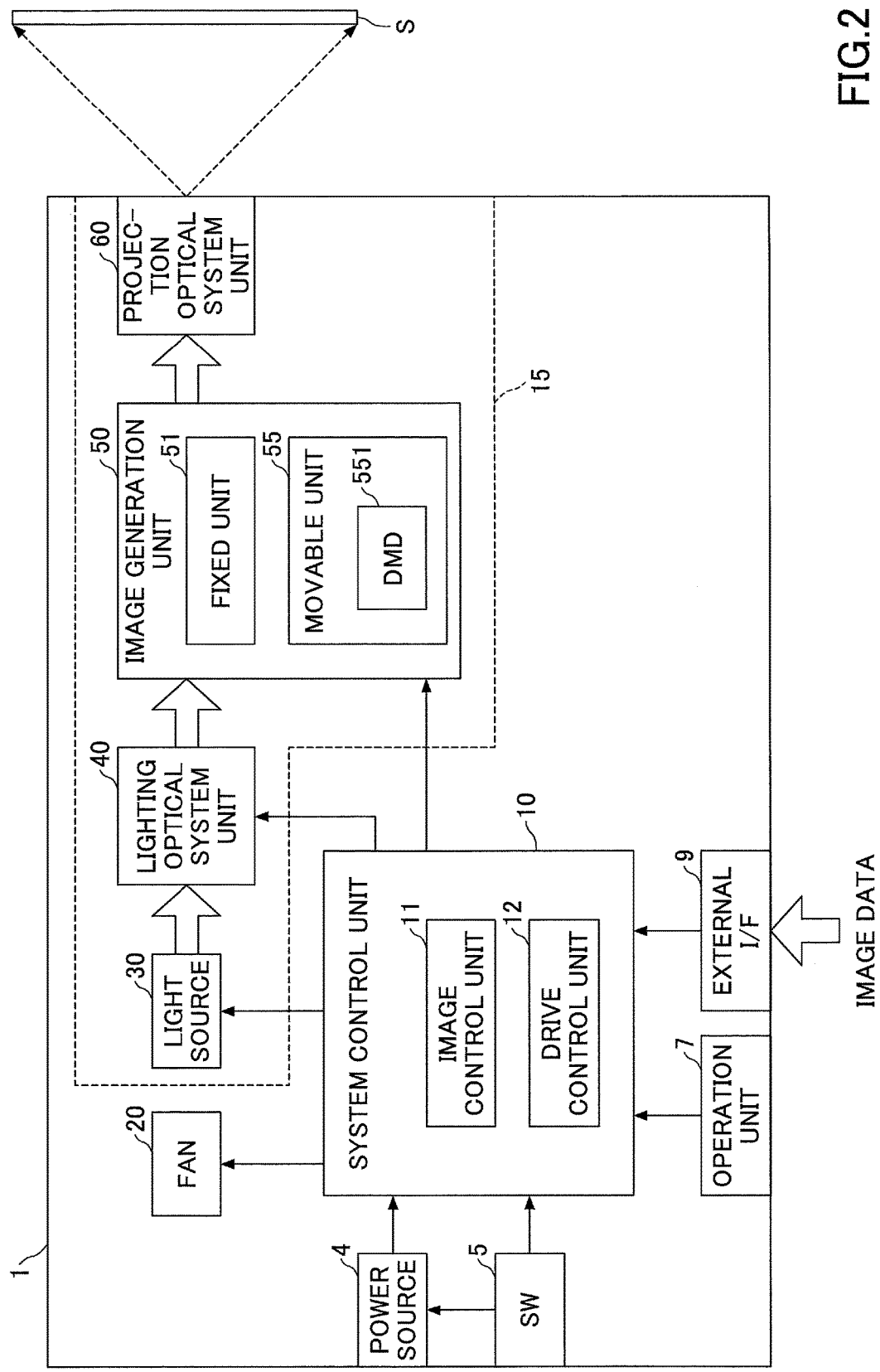
FIG. 2 is a block diagram illustrating a configuration of the image projection apparatus.

FIG. 2 is a block diagram showing a configuration of the projector 1 according to the first embodiment.

As shown in FIG. 2, the projector 1 includes a power source 4, a main switch (SW) 5, an operation unit 7, the external interface (I/F) 9, a system control unit 10, a fan 20, and an optical engine 15.

The power source 4 is connected to a commercial power source, converts voltage and frequency of the commercial power for the internal circuits of the projector 1, and supplies the resulting power to each of the system control unit 10, the fan 20, and the optical engine 15.

The main switch (SW) 5 is switched ON or OFF by a user to power on or off the projector 1. While the power source 4 is connected to the commercial power source via a power cord, if the main switch (SW) 5 is switched ON, the power source 4 starts supplying power to the respective components of the projector 1, and if the main switch 5 is switched OFF, the power source 4 stops supplying power to the respective components of the projector 1.

The operation unit 7 includes buttons configured to receive various input operations by a user. For example, the operation unit 7 is provided on a top surface of the projector 1. The operation unit 7 is configured to receive input operations by the user, such as selection of a size of a projection image, selection of a color tone, and adjustment of a focus. The user's input operation received by the operation unit 7 is sent to the system control unit 10.

The external interface 9 includes connection terminals connected to, for example, a personal computer (PC) or a digital camera, and is configured to supply image data, which is received from the connected apparatus, to the system control unit 10.

The system control unit 10 includes an image control unit 11 and a drive control unit 12. For example, the system control unit 10 may include a CPU (a processor), a ROM, and a RAM as hardware components thereof. The functions of the system control unit 10 may be implemented by instructions from the CPU when a program read from the ROM into the RAM is executed by the CPU.

The image control unit 11 is configured to control a digital micro-mirror device (DMD) 551 provided in an image generation unit 50 of the optical engine 15 based on the image data received from the external interface 9, to generate an image to be projected on the screen S.

The drive control unit 12 is configured to control a drive unit used for moving a movable unit 55 (which is provided to be movable in the image generation unit 50) and control a position of the DMD 551 provided in the movable unit 55.

The fan 20 is rotated under the control of the system control unit 10 to cool a light source 30 of the optical engine 15.

The optical engine 15 includes the light source 30, a lighting optical system unit 40, the image generation unit 50, and a projection optical system unit 60. The optical engine 15 is controlled by the system control unit 10 to project an image on the screen S.

Examples of the light source 30 include a mercury high-pressure lamp, a xenon lamp, and a light emitting diode (LED). The light source 30 is controlled by the system control unit 10 to emit light to the lighting optical system unit 40.

The lighting optical system unit 40 includes, for example, a color wheel, a light tunnel, and relay lenses. The lighting optical system unit 40 is configured to guide the light emitted from the light source 30 to the DMD 551 provided in the image generation unit 50.

The image generation unit 50, which is an example of an image generation apparatus in the claims, includes a fixed unit 51 that is fixed and supported on the image generation unit 50, and the movable unit 55 that is provided to be movable relative to the fixed unit 51. The movable unit 55 includes the DMD 551 and a position of the movable unit 55 relative to the fixed unit 51 is controlled by the drive control unit 12 of the system control unit 10. The DMD 551 is an example of an image generation unit in the claims. The DMD 551 is controlled by the image control unit 11 of the system control unit 10. The DMD 551 is configured to modulate the light received from the lighting optical system unit 40 and generate a projection image based on the received light.

The projection optical system unit 60 is an example of a projection unit in the claims. The projection optical system unit 60 includes, for example, a plurality of projection lenses and a mirror. The projection optical system unit 60 is configured to enlarge the image generated by the DMD 551 of the image generation unit 50, and project the enlarged image on the screen S.

<Configuration of Optical Engine>

Next, a configuration of the optical engine 15 of the projector 1 will be described.

Figure 3:
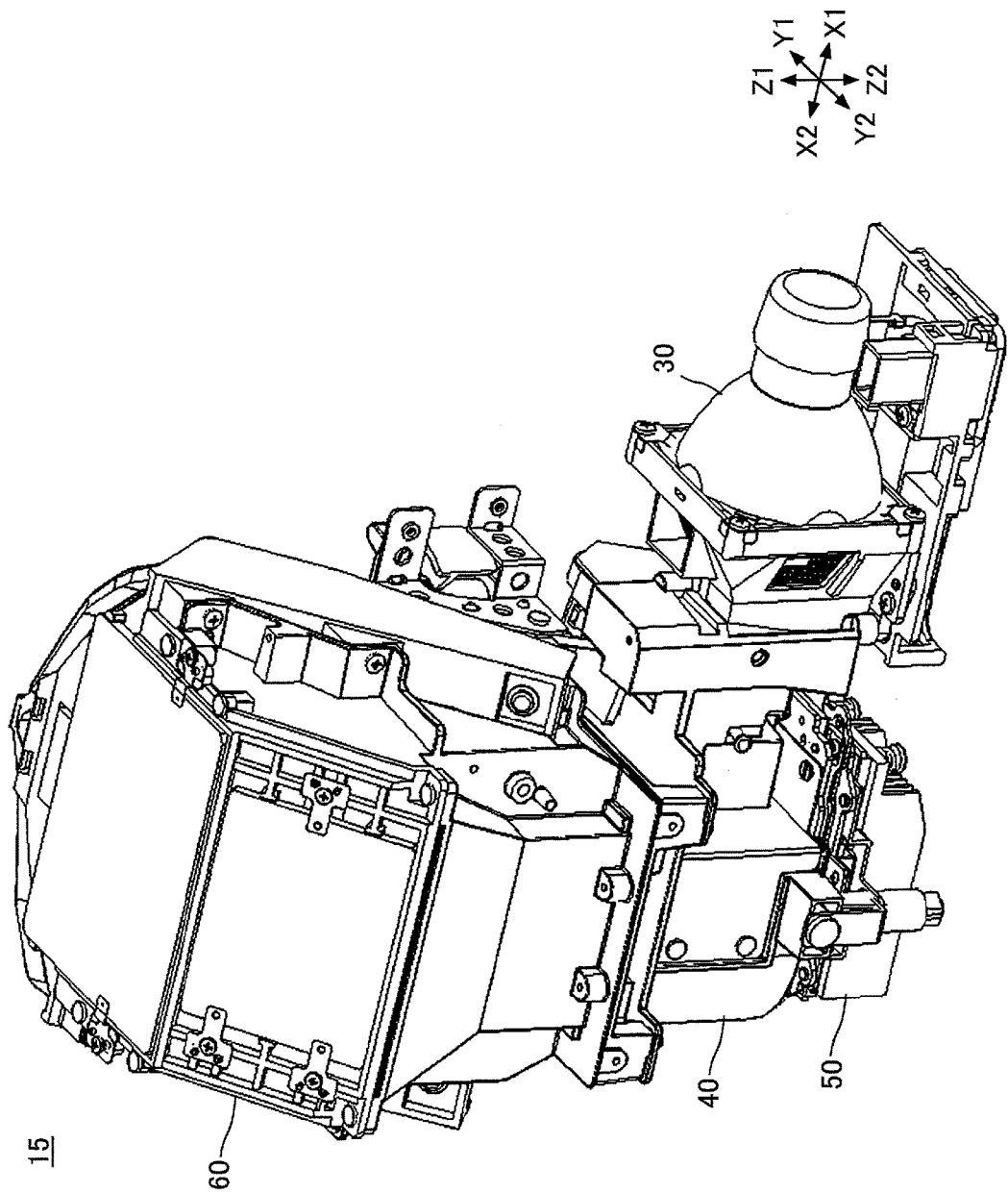
FIG. 3 is a perspective view illustrating an image engine according to the first embodiment.

FIG. 3 is a perspective view of the optical engine 15 according to the first embodiment. As shown in FIG. 3, the optical engine 15 includes the light source 30, the lighting optical system unit 40, the image generation unit 50, and the projection optical system unit 60. The optical engine 15 is provided in the inside of the projector 1.

The light source 30 is provided on a side surface of the lighting optical system unit 40. The light source 30 is configured to emit light in the X2 direction. The lighting optical system unit 40 is configured to guide the light emitted from the light source 30 to the image generation unit 50. The image generation unit 50 is provided beneath the lighting optical system unit 40. The image generation unit 50 is configured to generate a projection image based on the light received from the lighting optical system unit 40. The projection optical system unit 60 is provided above the lighting optical system unit 40. The projection optical system unit 60 is configured to project the projection image generated by the image generation unit 50 onto the screen S that is provided outside the projector 1.

The optical engine 15 of this embodiment is configured to project the image based on the light emitted from the light source 30 in an upward direction. Alternatively, the optical engine 15 may be configured to project the image in a horizontal direction.

[Lighting Optical System Unit]

Figure 4:
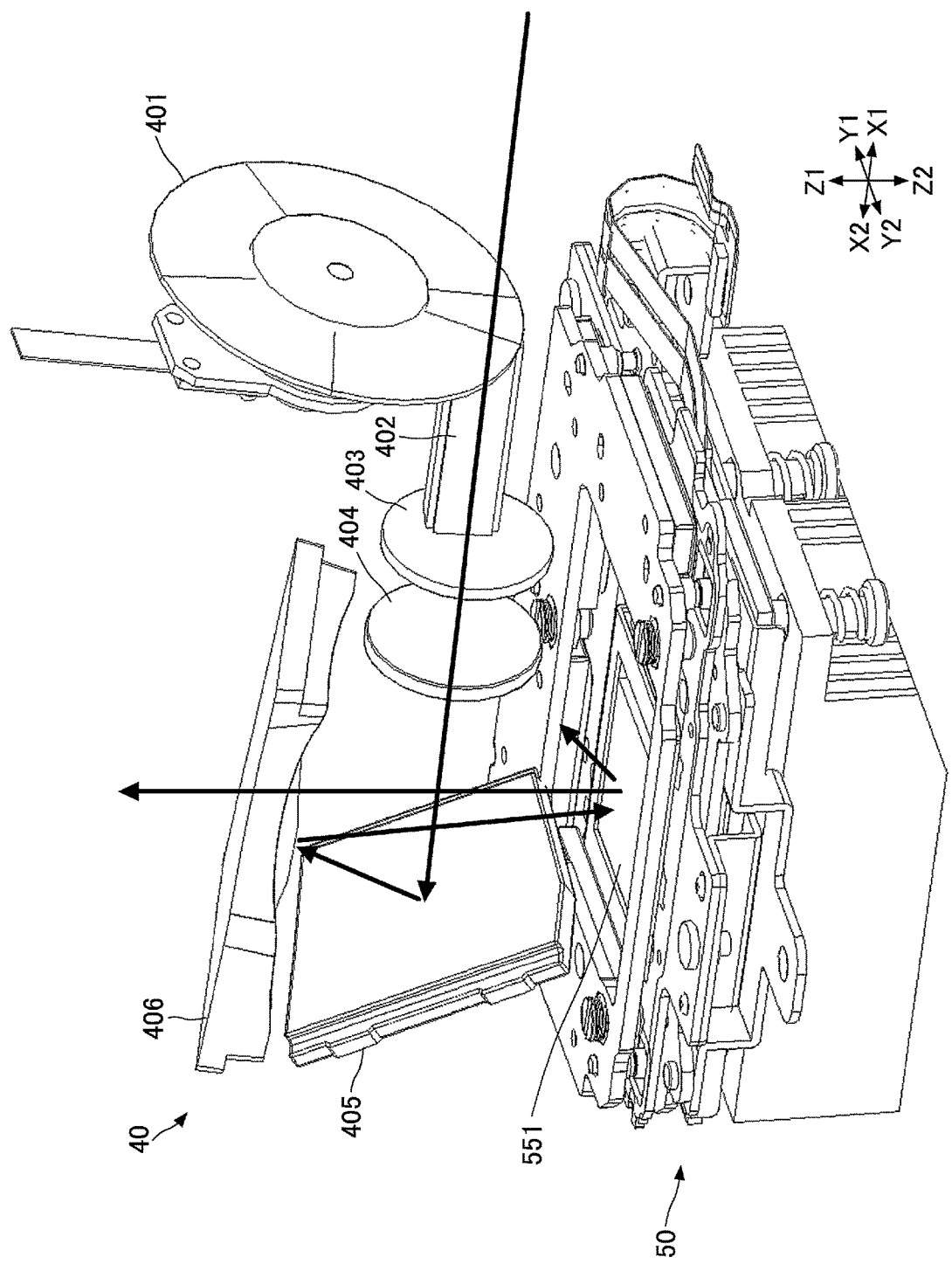
FIG. 4 is a drawing illustrating a lighting optical system unit according to the first embodiment.

FIG. 4 is a diagram showing the lighting optical system unit 40 according to the first embodiment.

As shown in FIG. 4, the lighting optical system unit 40 includes a color wheel 401, a light tunnel 402, relay lenses 403 and 404, a cylinder mirror 405, and a concave mirror 406.

The color wheel 401 is, for example, a disc-like component in which color filters of R (red), G (green), and B (blue) are provided at different portions in a circumferential direction thereof. The color wheel 401 is rotated at high speed so that the light emitted from the light source 30 is divided into RGB color light beams in a time-division manner.

The light tunnel 402 is, for example, a rectangular tube-like component formed of bonded glass sheets. The light tunnel 402 functions to perform multipath reflection of the RGB color light beams passing through the color wheel 401 by the internal surfaces thereof for equalization of luminance distribution, and guides the resulting light beams to the relay lenses 403 and 404.

The relay lenses 403 and 404 function to correct the chromatic aberrations on the optical axis of the light beams emitted from the light tunnel 402 and convert the light beams into converging light beams.

The cylinder mirror 405 and the concave mirror 406 function to reflect the light emitted from the relay lens 404 to the DMD 551 provided in the image generation unit 50. The DMD 551 is configured to modulate the light reflected from the concave mirror 406 and generate a projection image.

[Projection Optical System Unit]

Figure 5:
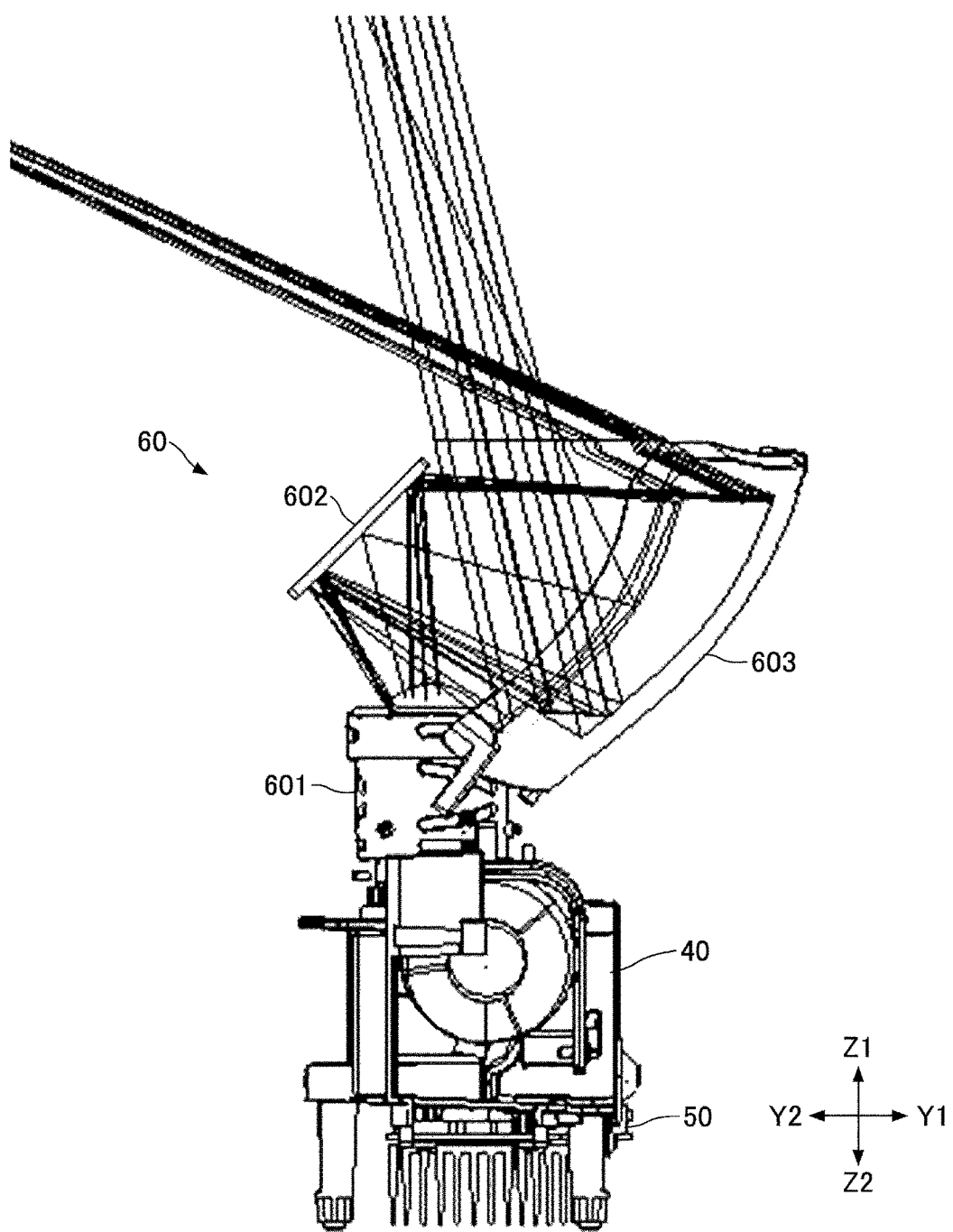
FIG. 5 is a drawing illustrating an internal configuration of a projection optical system unit according to the first embodiment.

FIG. 5 is a diagram showing an internal configuration of the projection optical system unit 60 according to the first embodiment.

As shown in FIG. 5, the projection optical system unit 60 includes projection lenses 601, a folding mirror 602, and a curved surface mirror 603 that are provided in a housing of the projection optical system unit 60.

The projection lenses 601 include a plurality of lenses. The projection lenses 601 function to focus the projection image generated by the DMD 551 of the image generation unit 50 onto the folding mirror 602. The folding mirror 602 and the curved surface mirror 603 function to reflect the focused projection image so as to be enlarged, and project the resulting image on the screen S that is provided outside the projector 1.

[Image Generation Unit]

Figure 6:
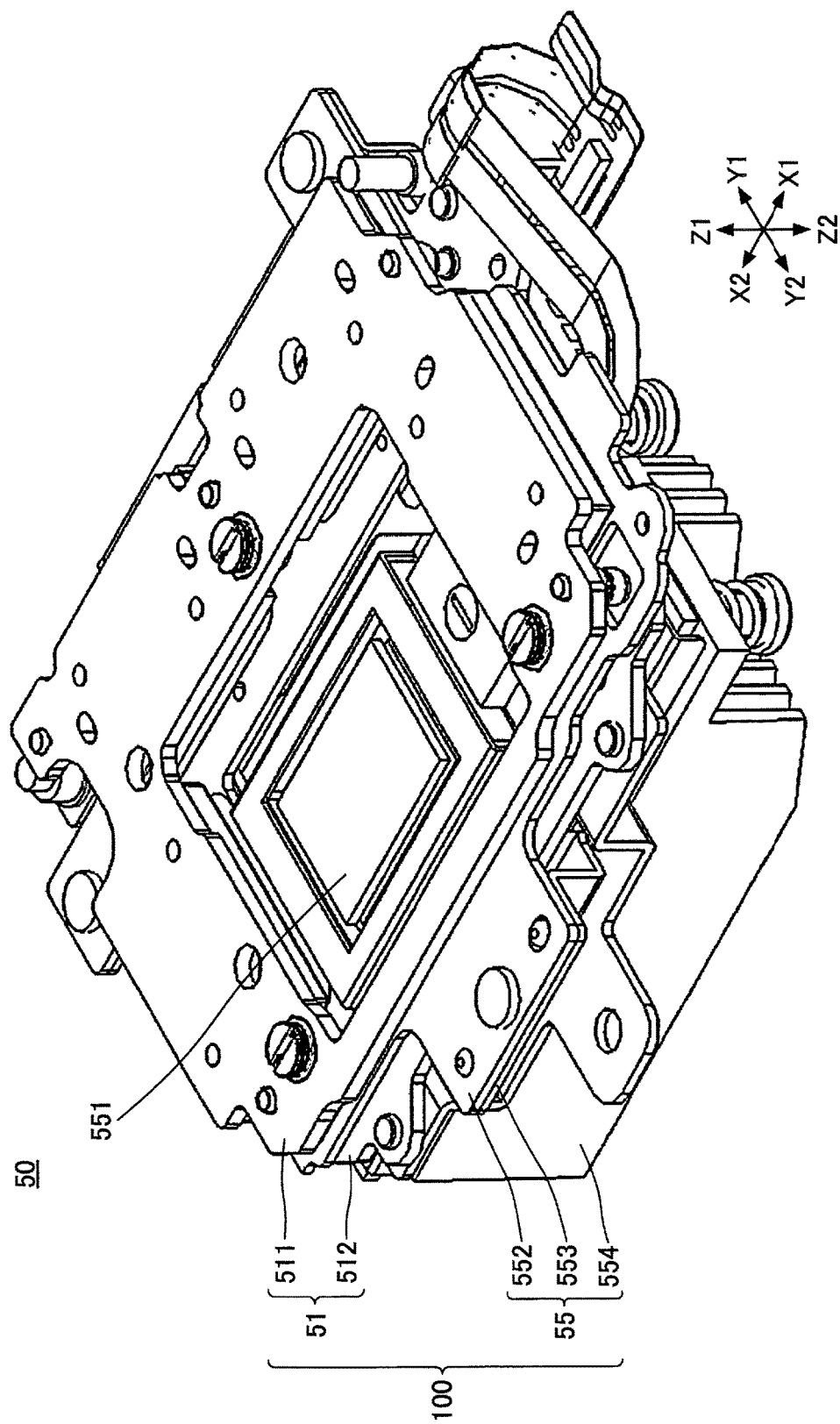
FIG. 6 is a perspective view illustrating an image generation unit according to the first embodiment.
Figure 7:
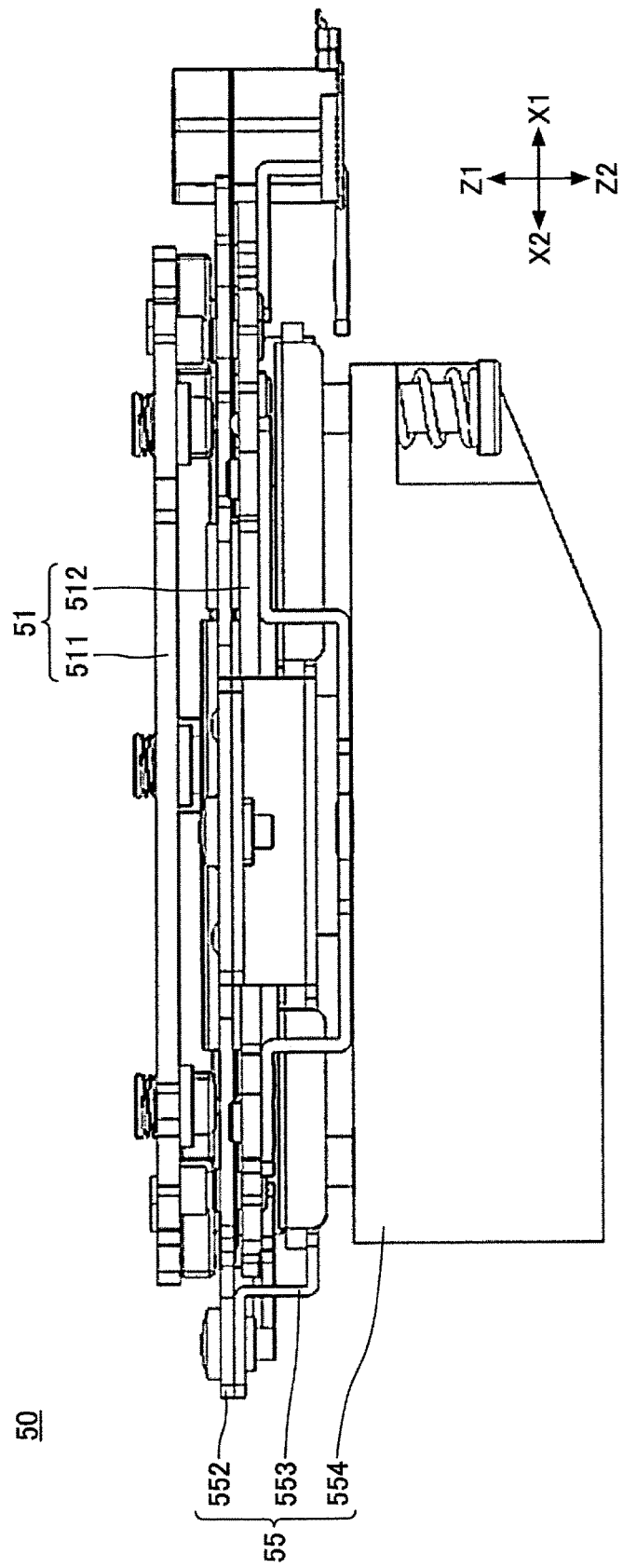
FIG. 7 is a side view illustrating the image generation unit.

FIG. 6 is a perspective view illustrating an image generation unit 50 according to the first embodiment. Further, FIG. 7 is a side view illustrating the image generation unit 50. In an example illustrated in the figures, the image generation apparatus 50 is an image forming apparatus in which a DMD 551 is included in a movable apparatus 100. The DMD 551 is an example of an image generation unit.

As illustrated in FIG. 6 and FIG. 7, the image generation unit 50 includes a fixed unit 51 and a movable unit 55. The fixed unit 51 is fixed and supported by a lighting optical system unit 40. The movable unit 55 is movably supported by the fixed unit 51.

The fixed unit 51 includes a top plate 511 and a base plate 512. The top plate 511 and the base plate 512 included in the fixed unit 51 are provided in parallel having a predetermined space therebetween. The fixed unit 51 is fixed beneath the lighting optical system unit 40.

The movable unit 55 includes the DMD 551, a movable plate 552, a coupling plate 553, and a heat sink 554. The movable unit 55 is movably supported by the fixed unit 51.

The movable plate 552 is disposed between the top plate 511 and the base plate 512 of the fixed unit 51. The movable plate 552 is supported by the fixed unit 51, and is movable in a direction parallel to the top plate 511 and the base plate 512.

The coupling plate 553 is fixed to the movable plate 552. The base plate 512 of the fixed unit 51 is sandwiched between the coupling plate 553 and the movable plate 552. The DMD 551 is fixed to an upper side surface of the coupling plate 553 and the heat sink 554 is fixed to a lower side surface of the coupling plate 553. The coupling plate 553 is fixed to the movable plate 552. As a result, together with the movable plate 552, the DMD 551 and the heat sink 554, the coupling plate 553 is movably supported by the fixed unit 51.

The DMD 551 is disposed on the movable plate 552 side surface of the coupling plate 553, and is movable together with the movable plate 552 and the coupling plate 553. The DMD 551 has an image generation surface on which a plurality of movable micro-mirrors are arranged in a lattice pattern. A mirror surface of each micro-mirror of the DMD 551 is configured to tilt around a torsion axis, and is ON/OFF driven based on an image signal transmitted from an image control unit 11 of a system control unit 10.

In the case of "ON", for example, a tilt angle of the micro-mirror is controlled to reflect light from a light source 30 to the projection optical system unit 60. Further, in the case of "OFF", for example, the tilt angle of the micro-mirror is controlled to reflect the light from the light source 30 to an OFF light plate.

As described above, the tilt angle of each micro-mirror of the DMD 551 is controlled by the image signal transmitted from the image control unit 11, and the light, which has been emitted from the light source 30 and passed through the lighting optical system unit 40, is modulated to generate a projection image.

The heat sink 554 is an example of a heat sink unit, and at least partially abuts the DMD 551. The heat sink 554 is disposed on the movably supported coupling plate 553 together with the DMD 551, and abuts the DMD 551. As a result, it is possible to provide efficient cooling. With the above arrangement, in the projector 1 according to an embodiment, temperature increase of the DMD 551 is suppressed by the heat sink 554. As a result, occurrence of defects such as a malfunction or an error due to the temperature increase of the DMD 551 is reduced.

Figure 8:
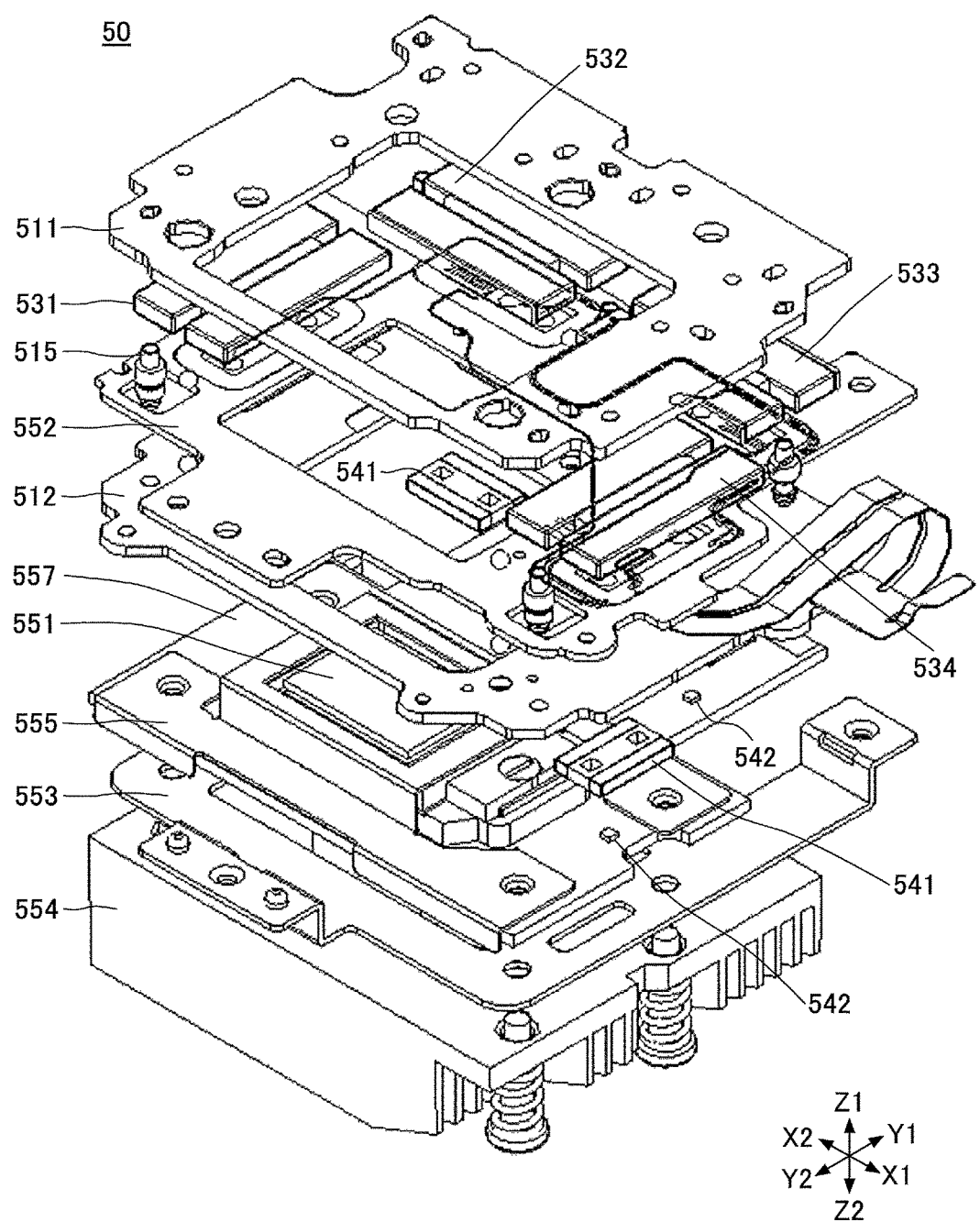
FIG. 8 is an exploded perspective view illustrating the image generation unit.
Figure 9:
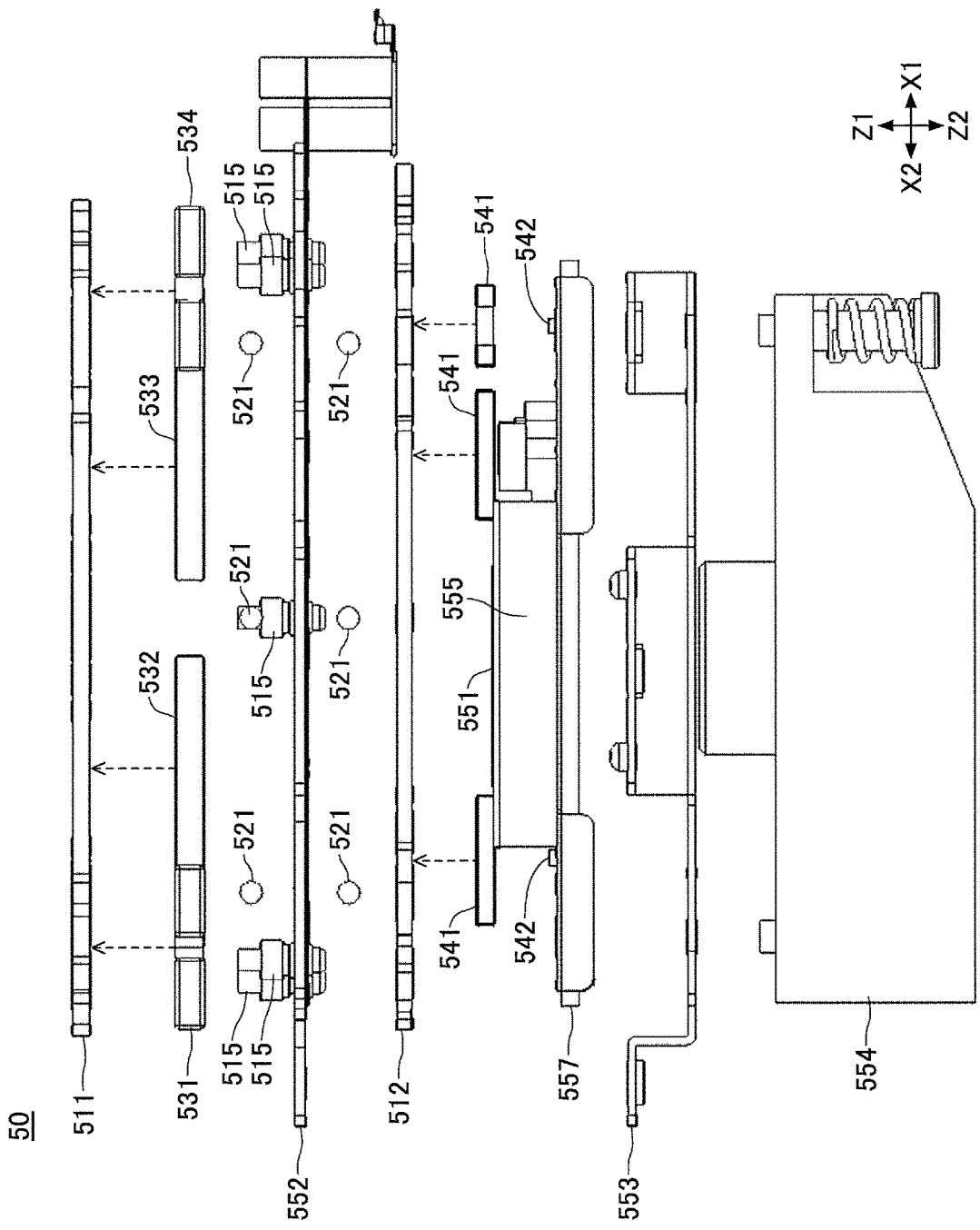
FIG. 9 is an exploded side view illustrating the image generation unit.

FIG. 8 is an exploded perspective view of the image generation unit 50 according to the first embodiment. Further, FIG. 9 is an exploded side view of the image generation unit 50. In the following, referring to FIG. 8 and FIG. 9, configurations of units will be described.

(Fixed Unit)

Figure 10:
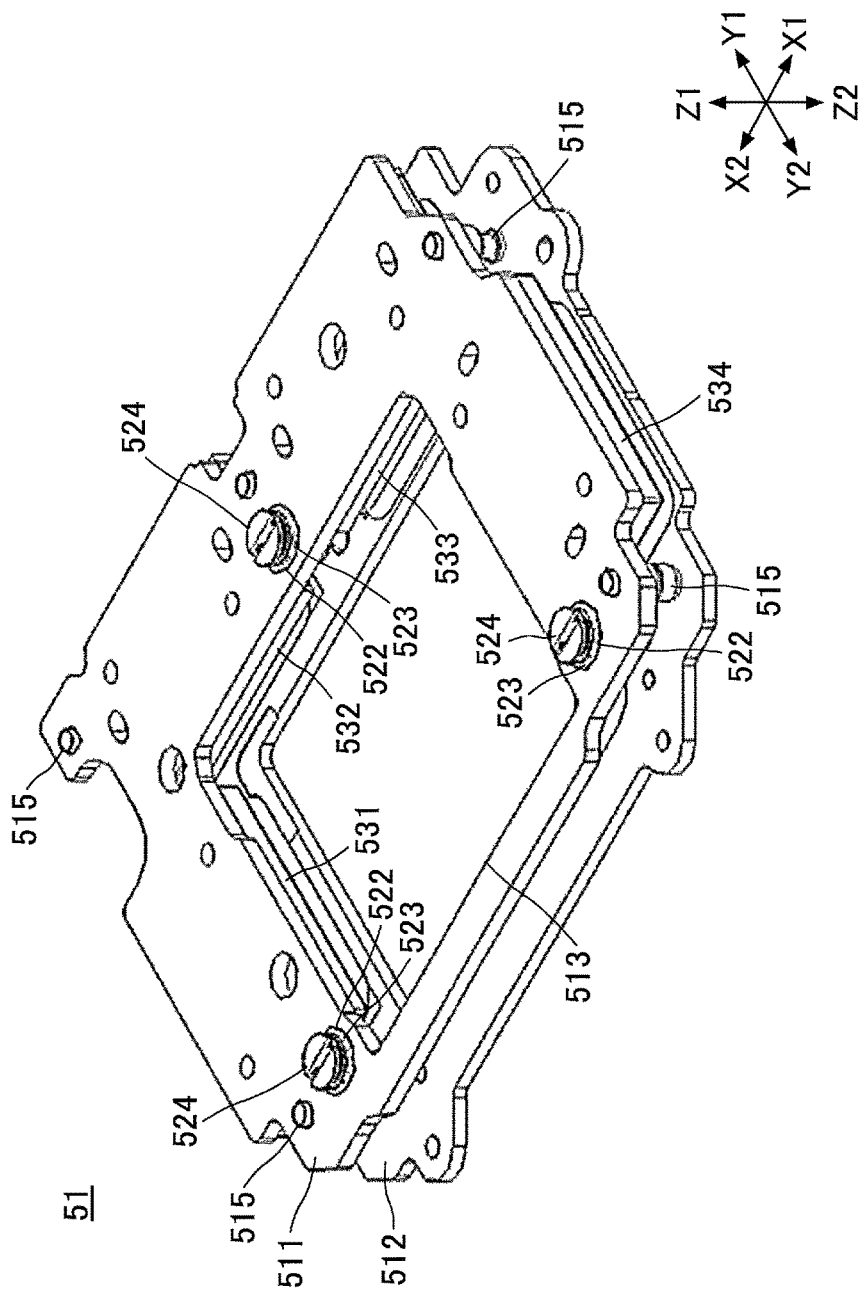
FIG. 10 is a perspective view illustrating a fixed unit according to the first embodiment.

FIG. 10 is a perspective view illustrating the fixed unit 51 according to the first embodiment. Further, FIG. 11 is an exploded perspective view illustrating the fixed unit 51.

Figure 11:
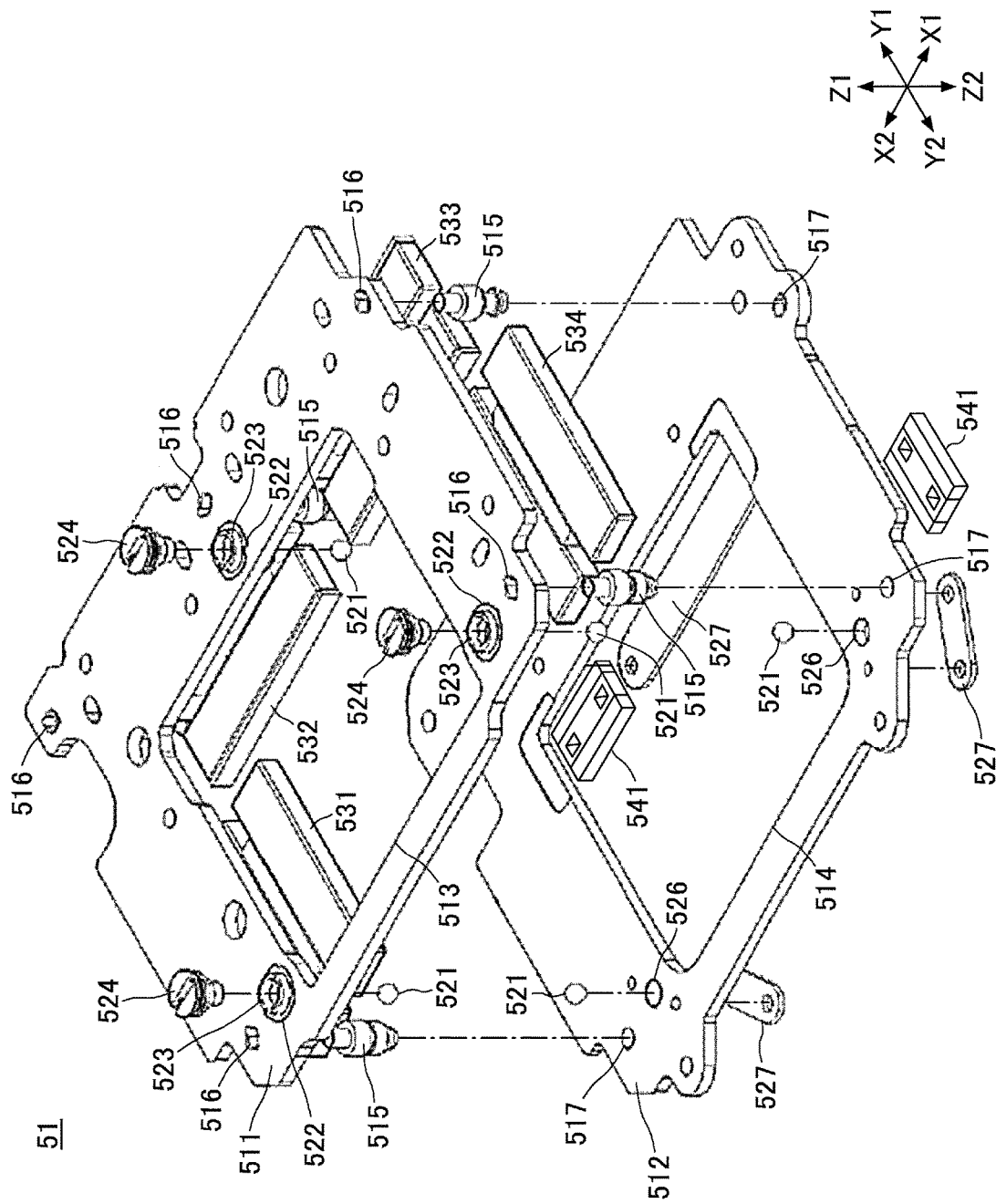
FIG. 11 is a exploded perspective view illustrating the fixed unit.

As illustrated in FIG. 10 and FIG. 11, the fixed unit 51 includes the top plate 511 as a first fixed plate and the base plate 512 as a second fixed plate.

The top plate 511 and the base plate 512 are flat plate members made of magnetic material including iron, stainless steel, etc. There are central holes 513 and 514 in the top plate 511 and the base plate 512, respectively. Positions of the central holes 513 and 514 correspond to the DMD 551 of the movable unit 55. Further, the top plate 511 and the base plate 512 are arranged in parallel with a predetermined space provided by a plurality of support posts 515.

As illustrated in FIG. 11, an upper end of the support post 515 is pressed into a support post hole 516 formed in the top plate 511, and a lower end of the support post 515 is inserted into a support post hole 517 formed in the base plate 512. A male screw groove is formed in the lower end of the support post 515. The support posts 515 create the predetermined space between the top plate 511 and the base plate 512 and support the top plate 511 and the base plate 512 in parallel.

Further, there are a plurality of support holes 522 and 526 for holding support balls 521 in the top plate 511 and the base plate 512, respectively. The support balls 521 are rotatably held in the support holes 522.

Cylindrical support members 523 are inserted in the support holes 522 of the top plate 511. Inner circumferential surfaces of the cylindrical support members 523 have a female screw groove. The support balls 521 are rotatably held in the support members 523. Position adjusting screws 524 are inserted on top of the support members 523. Bottom sides of the support holes 526 are closed by lid members 527, and the support balls 521 are rotatably held.

The support balls 521 rotatably held in the support holes 522 and 526 of the top plate 511 and the base plate 512 abut the movable plate 552 disposed between the top plate 511 and the base plate 512, and support the movable plate 552 in a movable manner.

Figure 12:
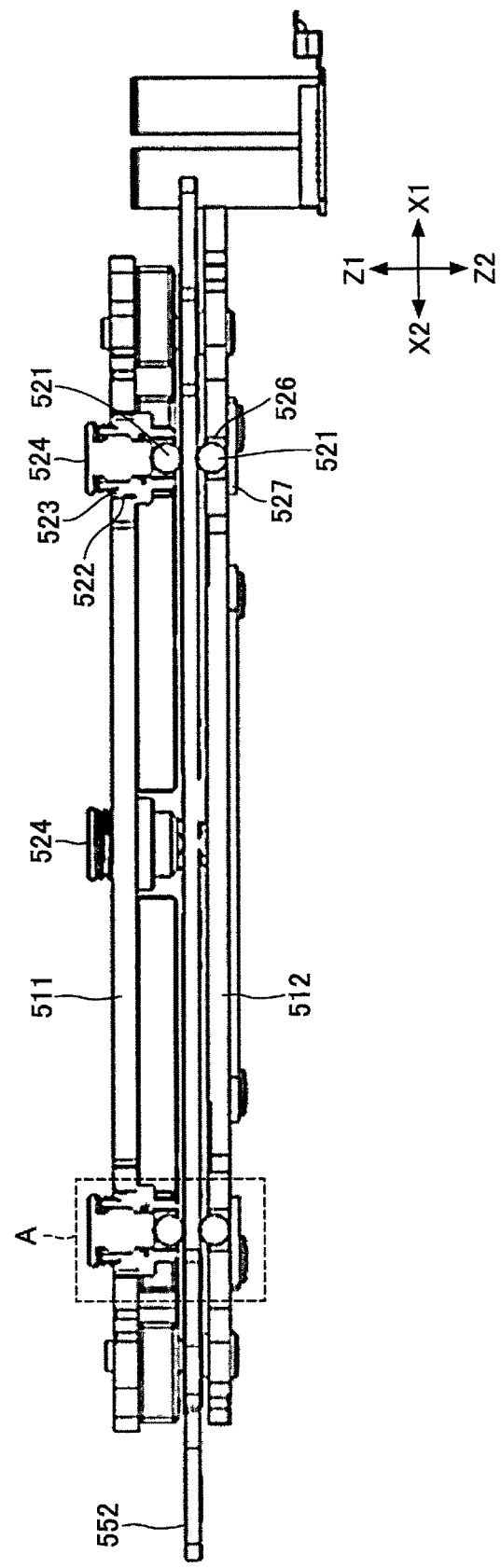
FIG. 12 is a drawing illustrating a supporting structure of a movable plate by the fixed unit.

FIG. 12 is a drawing illustrating a support structure of the movable plate 552 by the fixed unit 51 according to an embodiment. Further, FIG. 13 is a partially enlarged view illustrating a schematic configuration of a portion A indicated in FIG. 12.

Figure 13:
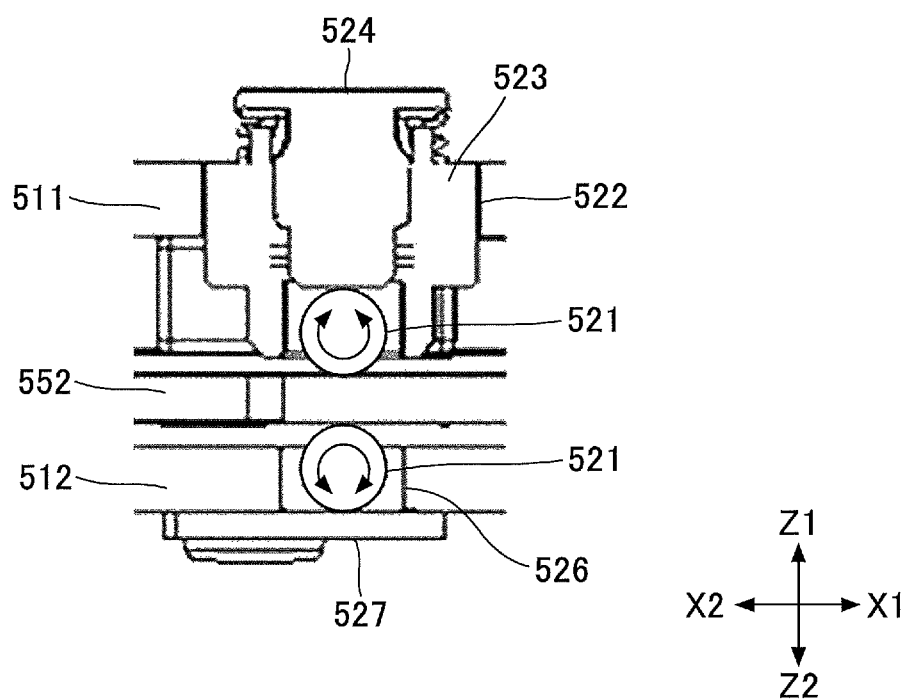
FIG. 13 is a partially enlarged view illustrating the supporting structure of the movable plate by the fixed unit.

As illustrated in FIG. 12 and FIG. 13, in the top plate 511, the support balls 521 are rotatably held by the support members 523 inserted in the support holes 522. Further, in the base plate 512, the support balls 521 are rotatably held in the support holes 526 whose bottom sides are closed by the lid members 527.

Each support ball 521 is held in such a way that at least a part of the support ball 521 protrudes from the support hole 522 or 526 to abut and support the movable plate 552 disposed between the top plate 511 and the base plate 512. The movable plate 552 is supported by the rotatable support balls 521 in such a way that the movable plate 552 is movable in a direction parallel to the top plate 511 and the base plate 512.

Further, a protruding amount of the support ball 521 included in the top plate 511 protruding from the bottom of the support member 523 changes according to the position of the position adjusting screw 524. The support ball 521 abuts the position adjusting screw 524 on the side opposite to the movable plate 552. For example, when the position of the position adjusting screw 524 changes in a Z1 direction, the protruding amount of the support ball 521 decreases, and the space between the top plate 511 and the movable plate 552 decreases. Further, for example, when the position of the position adjusting screw 524 changes in a Z2 direction, the protruding amount of the support ball 521 increases, and the space between the top plate 511 and the movable plate 552 increases.

As described above, it is possible to adjust the space between the top plate 511 and the movable plate 552 by changing the protruding amount of the support ball 521 by using the position adjusting screw 524.

Further, as illustrated in FIG. 8 through FIG. 11, drive magnets 531, 532, 533, and 534 are disposed on a base plate 512 side surface of the top plate 511.

Figure 14:
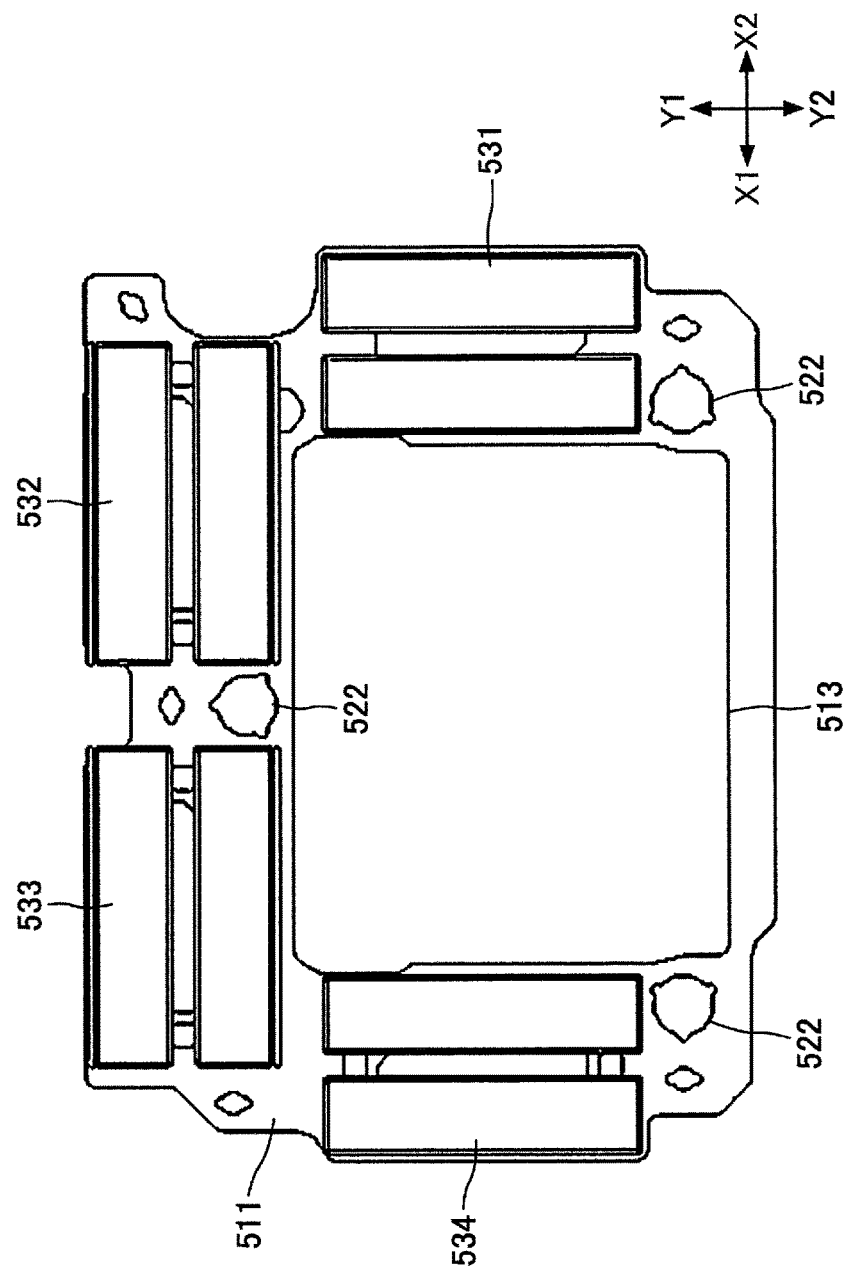
FIG. 14 is a bottom view illustrating a top plate according to the first embodiment.

FIG. 14 is a bottom view illustrating the top plate 511 according to an embodiment. As illustrated in FIG. 14, the drive magnets 531, 532, 533, and 534 are disposed on the base plate 512 side surface of the top plate 511.

The drive magnets 531, 532, 533, and 534 are disposed at four positions surrounding the central hole 513 of the top plate 511. Each of the drive magnets 531, 532, 533, and 534 includes two rectangular parallelepiped magnets whose longitudinal directions are in parallel. The drive magnets 531, 532, 533, and 534 generate magnetic fields that affect the movable plate 552 supported between the top plate 511 and the base plate 512.

The drive magnets 531, 532, 533, and 534, together with corresponding drive coils arranged on an upper surface of the movable plate 552 facing the corresponding drive magnets 531, 532, 533, and 534, form drive units for moving the movable plate 552.

Further, as illustrated in FIG. 8, FIG. 9, and FIG. 11, position detection magnets 541 are arranged at multiple positions on a bottom surface of the base plate 512 (a surface opposite to the top plate 511).

As illustrated in FIG. 8 and FIG. 9, the position detection magnets 541, together with Hall elements 542 disposed on a DMD substrate 557 in which the DMD 551 is included, form a position detection unit for detecting a position of the DMD 551. The Hall element 542 is an example of a magnetic sensor, and transmits a signal in accordance with a change of magnetic flux density from the position detection magnets 541 to the drive control unit 12 of the system control unit 10. The drive control unit 12 detects the position of the DMD 551 based on the signals transmitted from the Hall elements 542.

It should be noted that the number, positions, etc., of the support posts 515 and support balls 521 disposed on the fixed unit 51 are not limited to those described in an embodiment as long as the movable plate 552 can be movably supported.

(Movable Unit)

Figure 15:
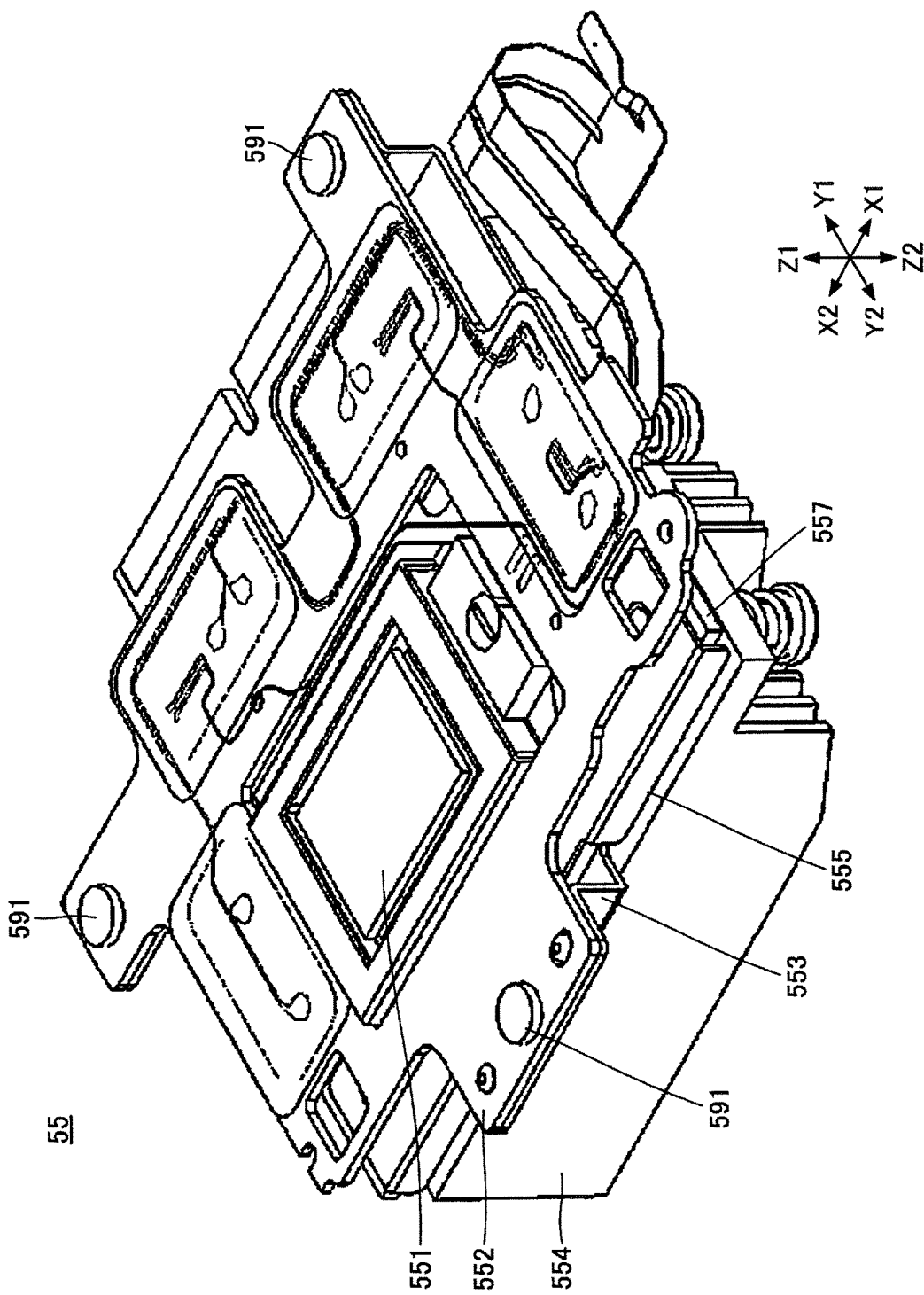
FIG. 15 is a perspective view illustrating a movable unit according to the first embodiment.

FIG. 15 is a perspective view illustrating the movable unit 55 according to the first embodiment. Further, FIG. 16 is an exploded perspective view illustrating the movable unit 55.

Figure 16:
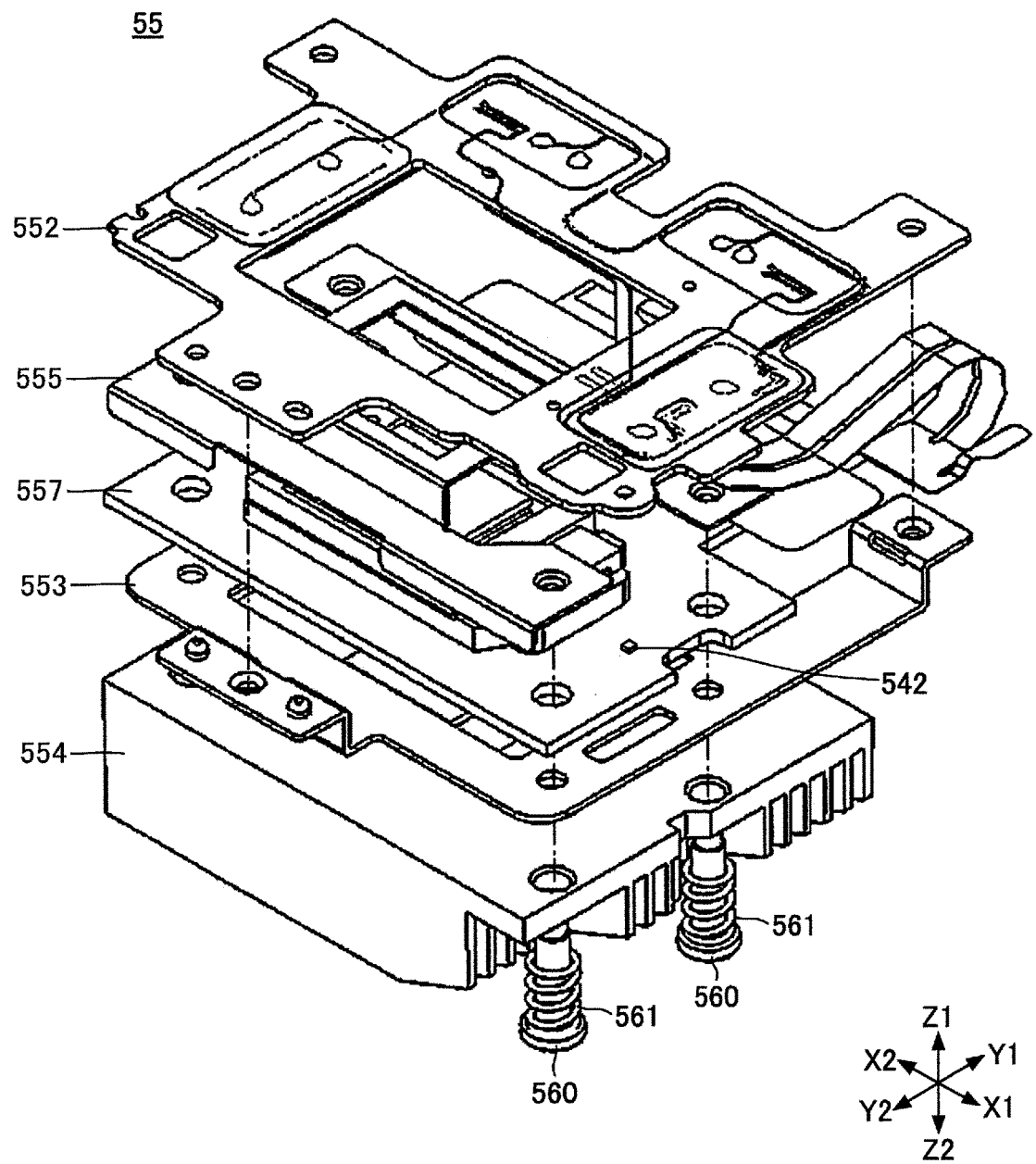
FIG. 16 is an exploded perspective view illustrating the movable unit.

As illustrated in FIG. 15 and FIG. 16, the movable unit 55 includes a movable plate 552. Further, the movable unit 55 includes as movable parts the coupling plate 553, the heat sink 554, a support member 555, and the DMD substrate 557. The DMD substrate 557 includes the DMD 551.

As described above, the movable plate 552 is disposed between the top plate 511 and the base plate 512 of the fixed unit 51, and supported by the support balls 521 in such a way that the movable plate 552 can move in a direction parallel to the top plate 511 and the base plate 512.

Figure 17:
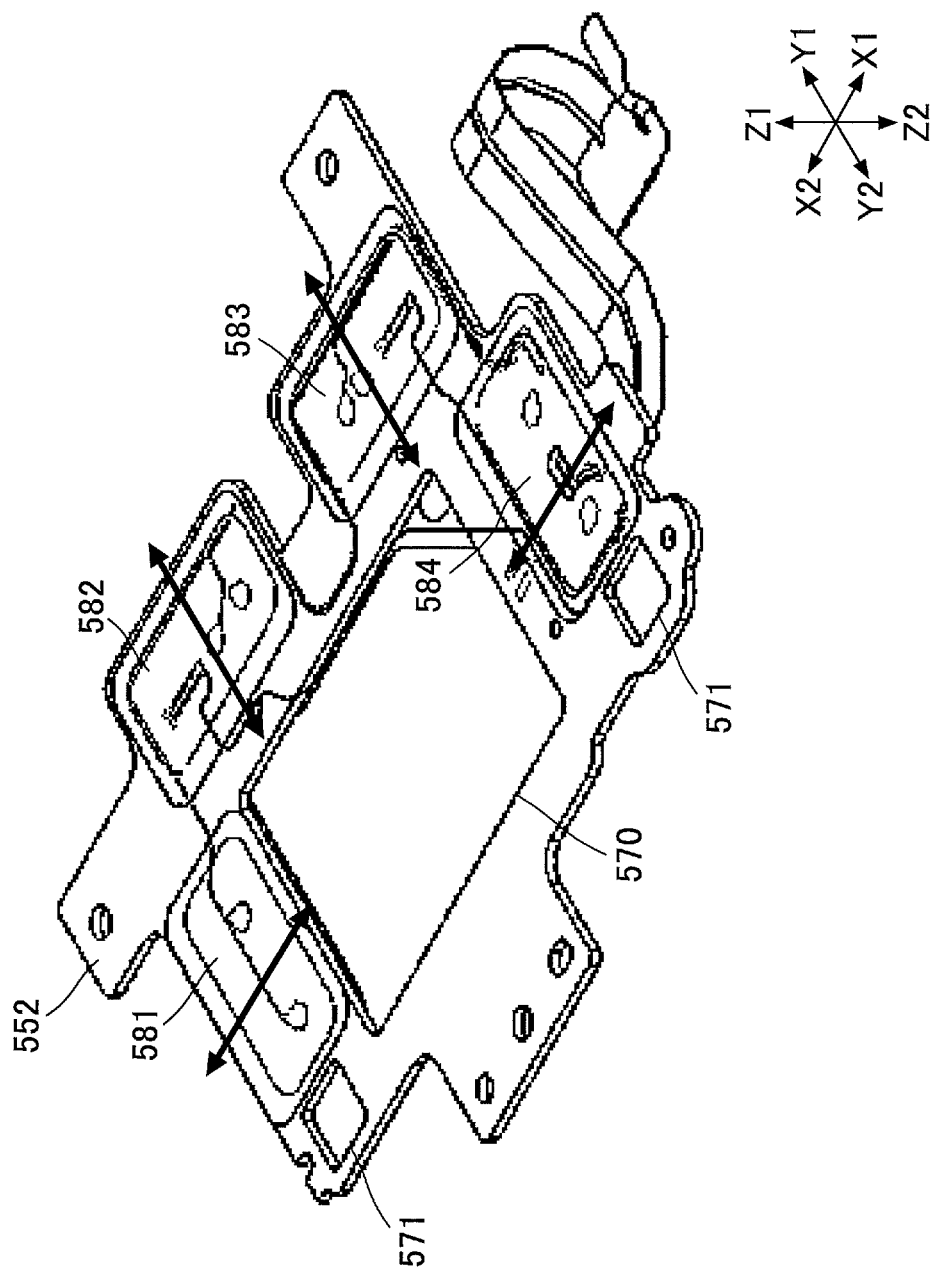
FIG. 17 is a perspective view illustrating a movable plate according to the first embodiment.

FIG. 17 is a perspective view illustrating the movable plate 552 according to an embodiment.

As illustrated in FIG. 17, the movable plate 552 is formed by flat plate members, has a central hole 570 at a position corresponding to the DMD 551 included in the DMD substrate 557, and has drive coils 581, 582, 583, and 584 around the central hole 570.

Each of the drive coils 581, 582, 583, and 584 is formed by an electric line coiled around an axis parallel to the Z1-Z2 direction, disposed in a concave portion formed in the top plate 511 side surface of the movable plate 552, and covered by a cover. The drive coils 581, 582, 583, and 584, together with the corresponding drive magnets 531, 532, 533, and 534 of the top plate 511, form a drive unit for moving the movable plate 552.

The drive magnets 531, 532, 533, and 534 of the top plate 511 are arranged at positions facing the corresponding drive coils 581, 582, 583, and 584 of the movable plate 552 in a state where the movable unit 55 is supported by the fixed unit 51. When a current flows in the drive coils 581, 582, 583, and 584, a Lorentz force as drive force for moving the movable plate 552 is generated due to the magnetic fields formed by the drive magnets 531, 532, 533, and 534.

Upon receiving the Lorentz force as drive force generated between the drive magnets 531, 532, 533, and 534 and the drive coils 581, 582, 583, and 584, the movable plate 552 changes its position linearly or rotationally in a X-Y plane with respect to the fixed unit 51.

Strength and a direction of the current flowing in each of the drive coils 581, 582, 583, and 584 are controlled by the drive control unit 12 of the system control unit 10. The drive control unit 12 controls a direction, an amount, an angle, etc., of the movement (rotation) of the movable plate 552 by the strength and the direction of the current flowing in each of the drive coils 581, 582, 583, and 584.

In an embodiment, the drive coil 581 and the drive magnet 531 are arranged facing the drive coil 584 and the drive magnet 534 in X1-X2 direction, which serves as a first drive unit. When a current flows in the drive coil 581 and the drive coil 584, a Lorentz force in a X1 direction or a X2 direction is generated as illustrated in FIG. 17. The movable plate 552 is moved in the X1 direction or the X2 direction due to the Lorentz force generated by the drive coil 581 and the drive magnet 531 or by the drive coil 584 and the drive magnet 534.

Further, in an embodiment, the drive coil 582, the drive magnet 532, the drive coil 583, and the drive magnet 533 are arranged alongside in the X1-X2 direction as a second drive unit. The longitudinal direction of the drive magnet 532 and the drive magnet 533 is arranged to be orthogonal to the longitudinal direction of the drive magnet 531 and the drive magnet 534. With the above arrangement, when a current flows in the drive coil 582 and the drive coil 583, a Lorentz force in a Y1 direction or a Y2 direction is generated as illustrated in FIG. 17.

The movable plate 552 is moved in the Y1 direction or the Y2 direction due to the Lorentz force generated by the drive coil 582 and the drive magnet 532 or by the drive coil 583 and the drive magnet 533. Further, the movable plate 552 is moved to rotate in a X-Y plane due to a Lorentz force generated by the drive coil 582 and the drive magnet 532 and a Lorentz force generated in the opposite direction by the drive coil 583 and the drive magnet 533.

For example, when a current flows in such a way that the Lorentz force in the Y1 direction is generated by the drive coil 582 and the drive magnet 532 and the Lorentz force in the Y2 direction is generated by the drive coil 583 and the drive magnet 533, the movable plate 552 is moved to rotate in a clockwise direction when viewed from above the movable plate 552. Further, when a current flows in such a way that the Lorentz force in the Y2 direction is generated by the drive coil 582 and the drive magnet 532 and the Lorentz force in the Y1 direction is generated by the drive coil 583 and the drive magnet 533, the movable plate 552 is moved to rotate in a counter clockwise direction when viewed from above the movable plate 552.

Further, there are movable range limit holes 571 in the movable plate 552 at positions corresponding to the support posts 515 of the fixed unit 51. The support posts 515 of the fixed unit 51 are inserted in the corresponding movable range limit holes 571. As a result, when the movable plate 552 is moved greatly due to vibration, some abnormality, etc., the movable plate 552 touches the support posts 515, and thus, a movable range of the movable plate 552 is limited.

Here, in an embodiment, the top plate 511 and the base plate 512 are made of magnetic material and function as yoke boards. As a result, the drive unit and a magnetic circuit are formed including the drive magnets 531, 532, 533, and 534, and the drive coils 581, 582, 583, and 584.

With the above arrangement, the magnetic flux generated by the drive unit is concentrated in the top plate 511 and the base plate 512, and thus, the leakage to the outside from between the top plate 511 and the base plate 512 is reduced.

Therefore, influence from the magnetic fields generated by the drive unit including the drive magnets 531, 532, 533, and 534, and the drive coils is reduced at the Hall elements 542 disposed on the DMD substrate 557 of the lower side surface of the base plate 512. Therefore, it is possible for the Hall elements 542 to output a signal in accordance with the change of the magnetic flux of the position detection magnets 541 without receiving influence of the magnetic fields from the drive unit, and thus, it is possible for the drive control unit 12 to determine the position of the DMD 551 with high accuracy.

As described above, it is possible for the drive control unit 12 to detect the position of the DMD 551 with high accuracy based on the output of the Hall elements 542 in which influence from the drive unit is reduced. Therefore, it is possible for the drive control unit 12 to control the position of the DMD 551 with high accuracy by controlling the strength and the direction of the current flowing in the drive coils 581, 582, 583, and 584.

It should be noted that the number, positions, etc., of the drive magnets 531, 532, 533, and 534, and the drive coils 581, 582, 583, and 584 as a drive unit may be different from those described in an embodiment as long as the movable plate 552 can be moved to any position.

For example, the drive magnets may be disposed on the base plate 512 and the drive coils may be disposed on the base plate 512 side surface of movable plate 552. Further, the drive magnets may be disposed on the movable plate 552 and the drive coils may be disposed on the top plate 511 or the base plate 512 facing the drive magnets. Further, the position detection magnets may be disposed on the DMD substrate 557 and the Hall elements 542 may be disposed on the lower surface of the base plate 512 facing the detection magnets. Further, the drive unit including the drive magnets and the drive coils may be disposed between the base plate 512 and the DMD substrate 557, and the position detection unit including the position detection magnets and the Hall elements may be disposed between the top plate 511 and the base plate 512.

It should be noted that, in any case, it is preferable that the drive magnets and the position detection magnets are disposed on the top plate 511 or the base plate 512 because, otherwise, there is a possibility that the weight of the movable unit 55 increases and it becomes difficult to control the position of the movable unit 55.

Further, the top plate 511 and the base plate 512 may be partially made of magnetic material as long as it is possible to reduce the leakage of the magnetic flux from the drive unit to the position detection unit. For example, the top plate 511 and the base plate 512 may be formed by laminating multiple members including a flat-plate-shaped member or a sheet-shaped member made of magnetic material. Further, the top plate 511 may be made of non-magnetic material as long as the base plate 512 is at least partially made of magnetic material and functions as a yoke board for preventing the leakage of the magnetic flux from the drive unit to the position detection unit.

Further, the number, positions, shapes, etc., of the movable range limit holes 571 are not limited to those described in an embodiment. For example, the number of the movable range limit holes 571 may be single or plural. Further, the shape of the movable range limit holes 571 may be a rectangle, a circle, etc., different from an embodiment.

As illustrated in FIG. 15, the coupling plate 553 is fixed to the lower side (the base plate 512 side) surface of the movable plate 552 that is movably supported by the fixed unit 51. The coupling plate 553 is formed by a flat-plate-shaped member, and has a central hole at a position corresponding to the DMD 551. Folded parts formed around the coupling plate 553 are fixed to the lower side surface of the movable plate 552 by three screws 591.

Figure 18:
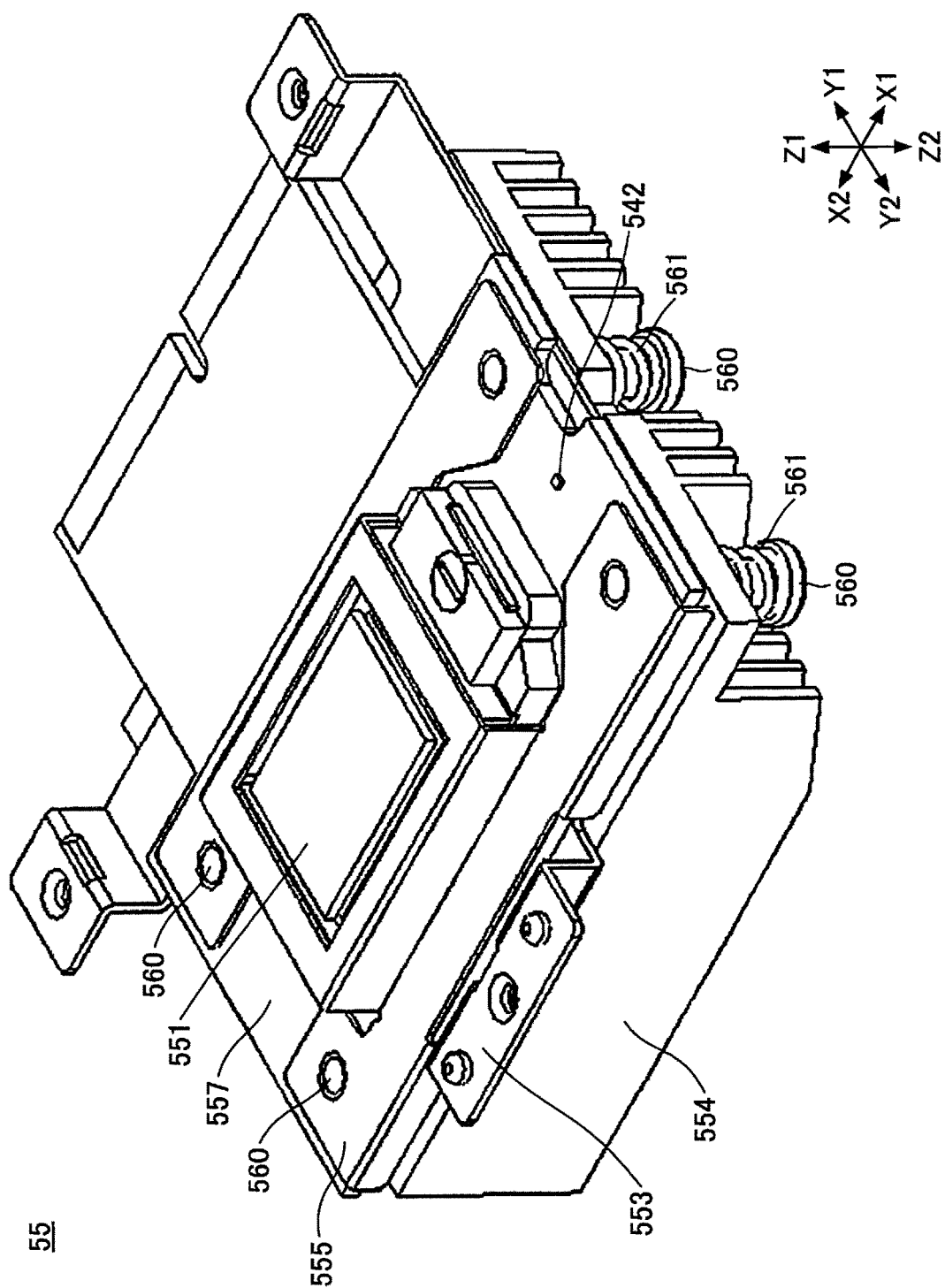
FIG. 18 is a perspective view illustrating the movable unit from which the movable plate is removed.

FIG. 18 is a perspective view illustrating the movable unit 55 from which the movable plate 552 is removed.

As illustrated in FIG. 18, the DMD 551 is disposed on the upper side surface of the coupling plate 553 and the heat sink 554 is disposed on the lower side surface of the coupling plate 553. The coupling plate 553 is fixed to the movable plate 552. As a result, the coupling plate 553 is, together with the DMD 551 and the heat sink 554, movable with the movable plate 552 with respect to the fixed unit 51.

The DMD 551 is included in the DMD substrate 557 and is fixed to the coupling plate 553. The DMD substrate 557 is sandwiched between the support member 555 and the coupling plate 553. As illustrated in FIG. 16 and FIG. 18, the support member 555, the DMD substrate 557, the coupling plate 553 and the heat sink 554 are piled up and fixed together by stepped screws 560 as fixing members and springs 561 as pressing units.

Figure 19:
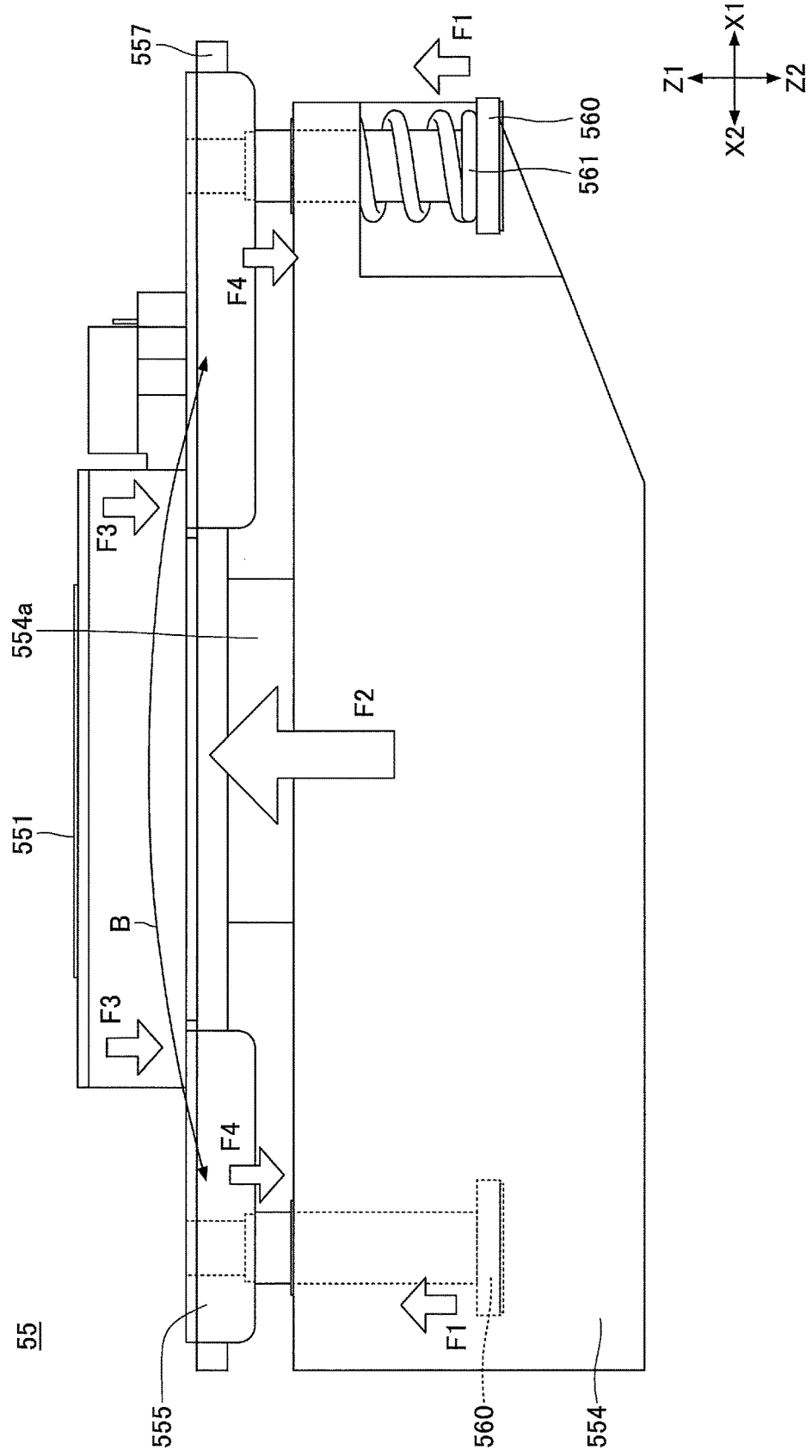
FIG. 19 is a drawing illustrating a DMD supporting structure of the movable unit.

FIG. 19 is a drawing illustrating a DMD supporting structure of the movable unit 55 according to the first embodiment. FIG. 19 is a side view of the movable unit 55. The movable plate 552 and the coupling plate 553 are omitted in FIG. 19.

As illustrated in FIG. 19, the heat sink 554 includes a protruding unit 554*a* that abuts the lower side surface of the DMD 551 through a through hole of the DMD substrate 557 in a state where the heat sink 554 is fixed to the coupling plate 553. It should be noted that the protruding unit 554*a* of the heat sink 554 may be arranged to abut the lower side surface of the DMD substrate 557 at a position corresponding to the DMD 551.

Further, in order to increase cooling effect of the DMD 551, an elastically deformable heat transfer sheet may be included between the protruding unit 554*a* of the heat sink 554 and the DMD 551. With the heat transfer sheet, thermal conductivity between the protruding unit 554*a* of the heat sink 554 and the DMD 551 increases, and thus, the cooling effect of the DMD 551 by the heat sink 554 increases.

As described above, the support member 555, the DMD substrate 557, and the heat sink 554 are piled up and fixed together by the stepped screws 560 and the springs 561. When the stepped screws 560 are tightened, the springs 561 are compressed in a Z1-Z2 direction and a force F1 in a Z1 direction illustrated in FIG. 19 is generated by the spring 561. The heat sink 554 is pressed against the DMD 551 with a force F2 in the Z1 direction according to the forces F1 generated by the springs 561.

In an embodiment, there are four locations in which the stepped screw 560 and the spring 561 are arranged. The force F2 applied to the heat sink 554 is equal to the combined four forces F1 generated by the four springs 561. Further, the force F2 from the heat sink 554 acts on the support member 555 that supports the DMD substrate 557 including the DMD 551. As a result, a reaction force F3 in a Z2 direction corresponding to the force F2 from the heat sink 554 is generated in the support member 555, and thus, the DMD substrate 557 can be supported between the support member 555 and the coupling plate 553.

Forces F4 in the Z2 direction act on the stepped screws 560 and the springs 561 due to the force F3 generated in the support member 555. The springs 561 are arranged in four locations. The force F4 acting on each spring 561 corresponds to one fourth of the force F3 generated in the support member 555, and is balanced with the force F1.

Further, the support member 555 is flexible as illustrated by an arrow B in FIG. 19 and is formed in a leaf spring shape. The support member 555 bows by being pressed by the protruding unit 554*a* of the heat sink 554, a force is generated for pushing back the heat sink 554 in the Z2 direction, and thus, the contact between the DMD 551 and the heat sink 554 can be kept stronger.

As described above, in the movable unit 55, the movable plate 552 and the coupling plate 553 including the DMD 551 and the heat sink 554 are movably supported by the fixed unit 51. The position of the movable unit 55 is controlled by the drive control unit 12 of the system control unit 10. Further, in the movable unit 55, the heat sink 554 is provided that abuts the DMD 551. As a result, occurrence of defects such as a malfunction or an error due to the temperature increase of the DMD 551 is prevented.

<Image Projection>

As described above, the DMD 551 for generating a projection image is disposed on the movable unit 55 in the projector 1 according to an embodiment. The position of the DMD 551, together with the movable unit 55, is controlled by the drive control unit 12 of the system control unit 10.

For example, the drive control unit 12 controls the position of the movable unit 55 in such a way that the movable unit 55 moves with high speed between a plurality of positions separated from each other by less than an array spacing of the micro-mirrors of the DMD 551 at a predetermined cycle corresponding to a frame rate when projecting an image. At this time, the image control unit 11 transmits an image signal to the DMD 551 so that a projection image shifted according to each of the positions is generated.

For example, the drive control unit 12 controls the DMD 551 to make reciprocating movement at a predetermined cycle between a position P1 and a position P2 separated from each other in the X1-X2 direction and the Y1-Y2 direction by less than the array spacing of the micro-mirrors of the DMD 551. At this time, it is possible for the image control unit 11 to cause resolution of the projection image to be about double of resolution of the DMD 551 by controlling the DMD 551 to generate a projection image shifted according to each of the positions. Further, it is even possible to make the resolution of the projection image more than double of the resolution of the DMD 551 by increasing the number of moving positions of the DMD 551.

As described above, it is possible to project an image whose resolution is higher than the resolution of the DMD 551 by having the drive control unit 12 control the movable unit 55, together with the DMD 551, to move at a predetermined cycle, and by having the image control unit 11 control the DMD 551 to generate a projection image according to the position of the DMD 551.

Further, in the projector 1 according to an embodiment, it is possible to rotate a projection image without shrinking by having the drive control unit 12 control the DMD 551 to rotate together with the movable unit 55. For example, in a projector in which an image generation unit such as the DMD 551 is fixed, it is impossible to rotate a projection image without shrinking the projection image while keeping the aspect ratio the same. On the contrary, in the projector 1 according to an embodiment, it is possible to rotate the DMD 551, and thus, it is possible to rotate the projection image to adjust the tilt without shrinking the projection image.

As described above, in the projector 1 according to an embodiment, it is possible to increase the resolution of the projection image by having the DMD 551 movable. Further, the heat sink 554 for cooling the DMD 551 is mounted on the movable unit 55 together with the DMD 551. As a result, the heat sink 554 abuts the DMD 551 and it is possible to provide the cooling more efficiently and suppress the temperature increase of the DMD 551. As a result, in the projector 1, defects such as a malfunction and an error that occur due to the temperature increase of the DMD 551 are reduced.

Furthermore, in an embodiment, the top plate 511 and the base plate 512 function as yoke boards for preventing the leakage of the magnetic flux generated by the drive unit including the drive magnets and the drive coils to the outside. As a result, it is possible for the Hall elements 542 disposed on the DMD substrate 557 of the lower side surface of the base plate 512 to output a signal according to the change of the magnetic flux density of the position detection magnets 541 without being affected by the magnetic fields generated by the drive unit. Therefore, it is possible for the drive control unit 12 to detect with high accuracy the position of the DMD 551 based on the output of the Hall elements 542, which position is shifted with high speed.

Second Embodiment

Next, a second embodiment will be described by referring to the drawings. It should be noted that the description of the same parts as the first embodiment will be omitted.

Figure 20:
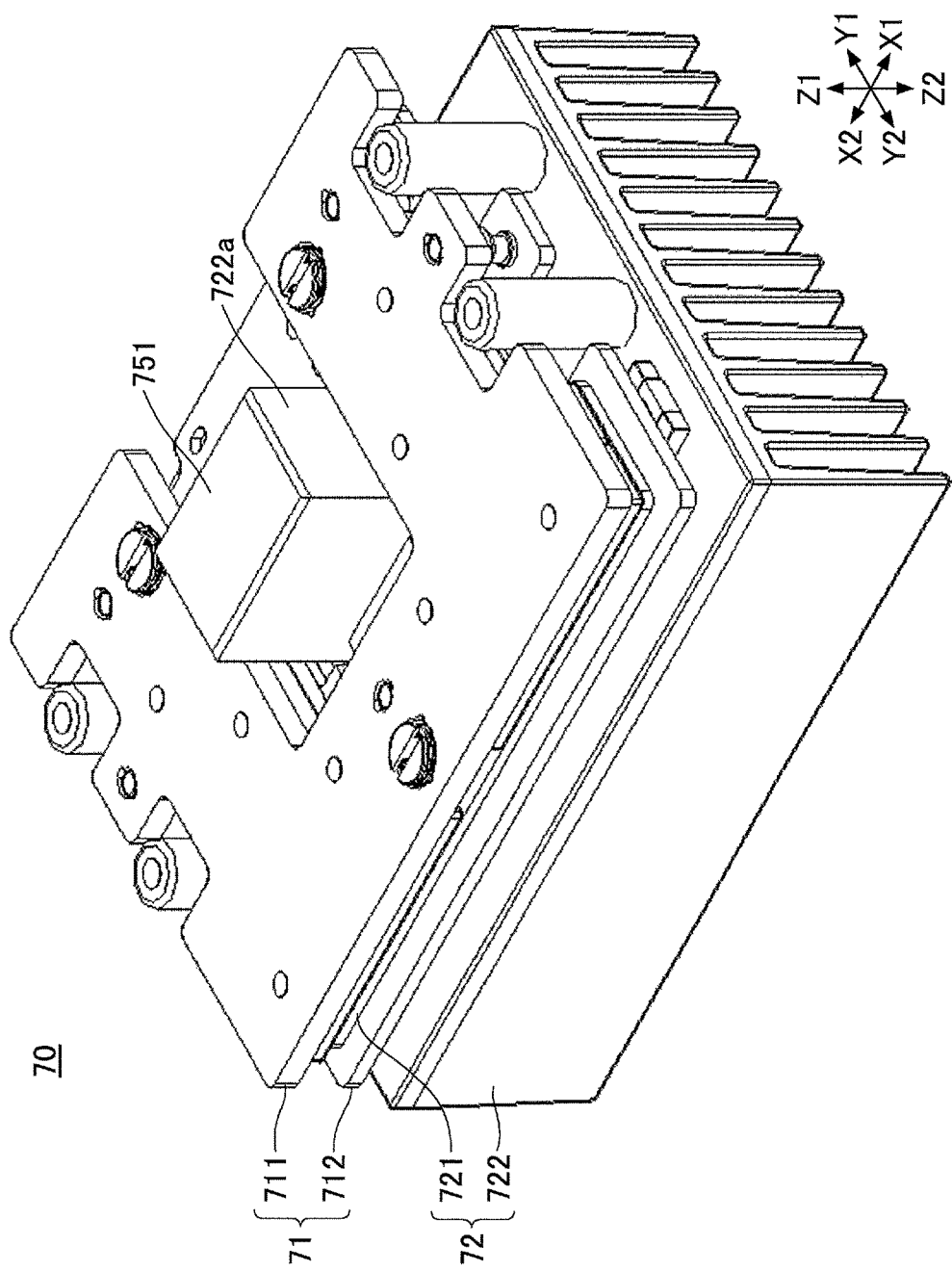
FIG. 20 is a perspective view illustrating an image generation unit according to a second embodiment.
Figure 21:
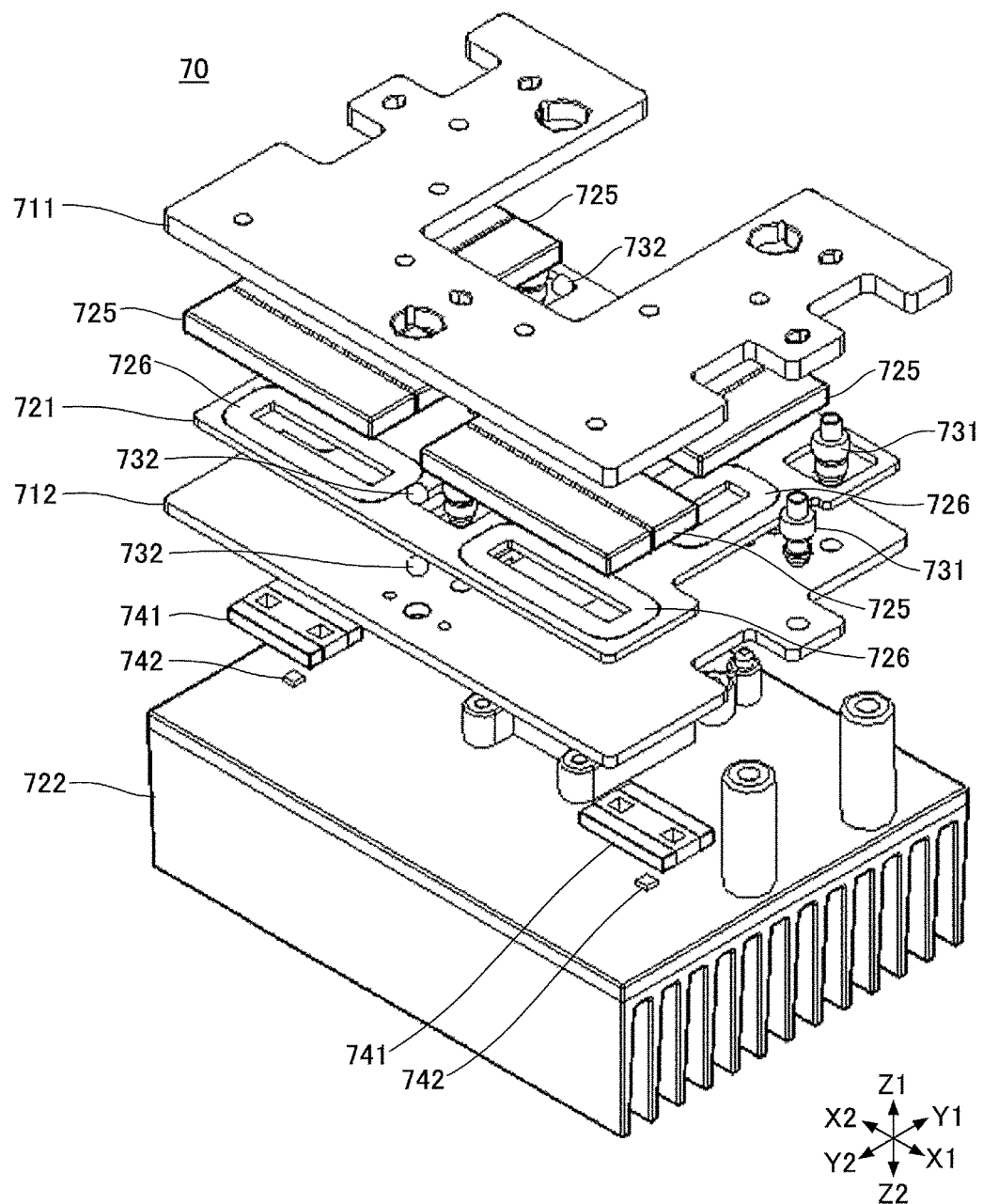
FIG. 21 is an exploded perspective view illustrating the image generation unit.
Figure 22:
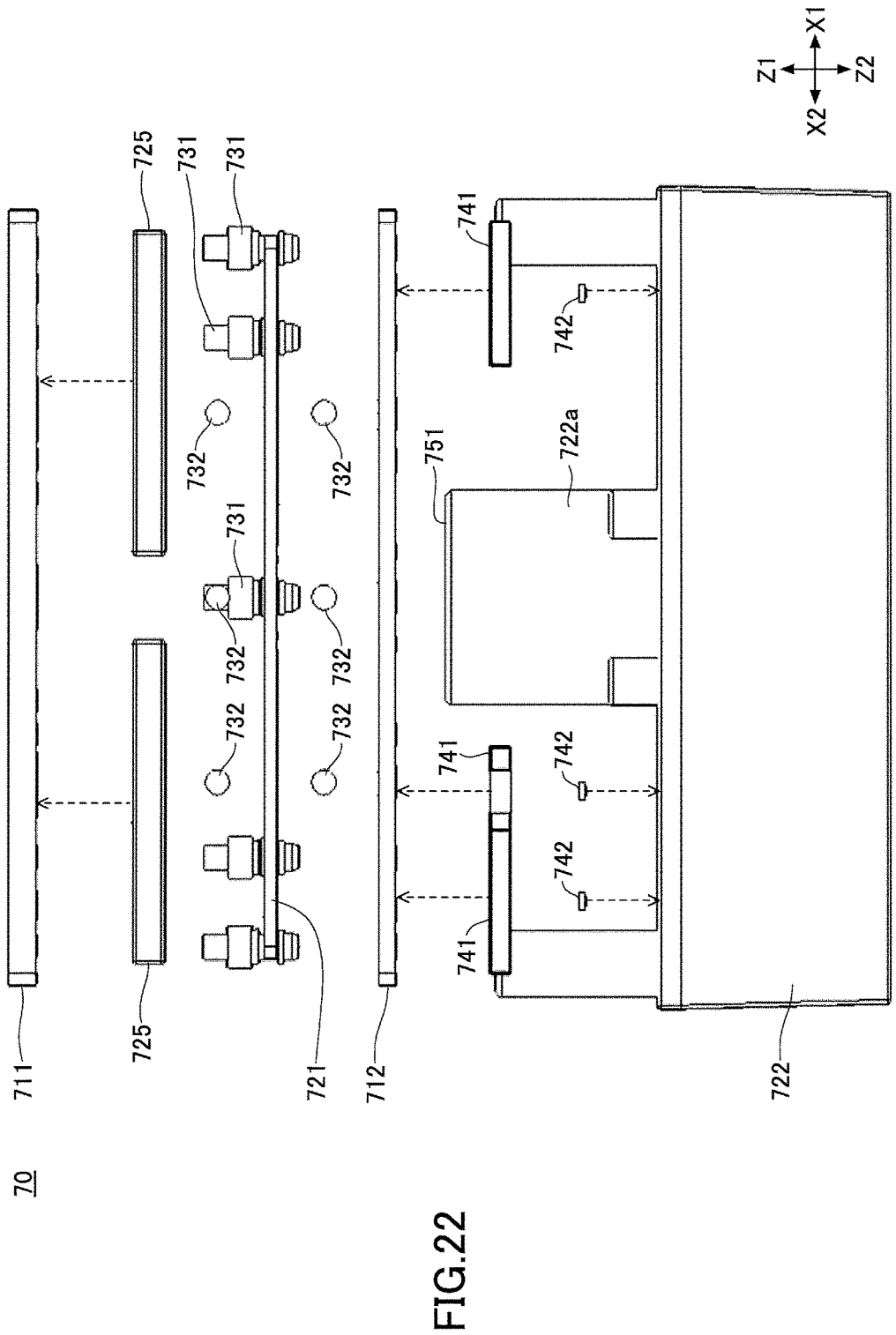
FIG. 22 is an exploded side view illustrating the image generation unit.

FIG. 20 is a perspective view illustrating an image generation unit 70 according to the second embodiment. FIG. 21 is an exploded perspective view illustrating the image generation unit 70. Further, FIG. 22 is an exploded side view illustrating the image generation unit 70. In an example illustrated in the figures, the image generation apparatus 70 is an image forming apparatus in which a DMD 751 is included in a movable apparatus. The DMD 751 is an example of an image generation unit.

As illustrated in FIG. 20, the image generation unit 70 includes a fixed unit 71 and a movable unit 72. The fixed unit 71 is fixed and supported by a lighting optical system unit 40 of the projector 1. The movable unit 72 is movably supported by the fixed unit 71.

As illustrated in FIG. 20 through FIG. 22, the fixed unit 71 includes a top plate 711 as a first fixed plate and a base plate 712 as a second fixed plate. The top plate 711 and the base plate 712 are linked in parallel with a predetermined space provided by a plurality of support posts 731.

As illustrated in FIG. 20 through FIG. 22, the movable unit 72 includes a movable plate 721 and a heat sink 722 as a movable part, and is movably supported by the fixed unit 71. The heat sink 722 includes a DMD 751.

The movable plate 721 is disposed between the top plate 711 and the base plate 712 of the fixed unit 71. The movable plate 721 is, similar to the first embodiment, movably supported by a plurality of support balls 732 which are rotatably held in the top plate 711 and the base plate 712.

The heat sink 722 is fixed to the movable plate 721. The base plate 712 of the fixed unit 71 is sandwiched between the heat sink 722 and the movable plate 721. As illustrated in FIG. 20 and FIG. 22, the heat sink 722 includes a protruding unit 722*a* that protrudes upwards from the top plate 711. The DMD 751 is disposed on the upper side surface of the protruding unit 722*a* of the heat sink 722.

As illustrated in FIG. 21 and FIG. 22, a plurality of drive magnets 725 are disposed on the movable plate 721 side surface of the top plate 711. Further, as illustrated in FIG. 21, a plurality of drive coils 726 facing the corresponding drive magnets 725 are disposed on the top plate 711 side surface of the movable plate 721. The drive magnets 725 and the drive coils 726 form a drive unit for moving the movable plate 721.

When a current flows in the drive coils 726, a Lorentz force as a drive force for moving the movable plate 721 is generated due to the magnetic fields generated by the drive magnets 725. Upon receiving the Lorentz force generated between the drive magnets 725 and the drive coils 726, the movable plate 721 changes its position linearly or rotationally in a X-Y plane with respect to the fixed unit 71.

As illustrated in FIG. 21 and FIG. 22, position detection magnets 741 are arranged at multiple places on a lower side surface of the base plate 712. Further, a plurality of Hall elements 742 facing the corresponding position detection magnets 741 are arranged on an upper side surface of the heat sink 722.

The position detection magnets 741 and the Hall elements 742 form a position detection unit for detecting a position of the DMD 751. The Hall element 742 transmits a signal in accordance with a change of magnetic flux density of the position detection magnet 741 to the drive control unit 12 of the system control unit 10. The drive control unit 12 detects the position of the DMD 751 based on the signals transmitted from the Hall elements 742, and controls the drive unit to move the movable unit 72 based on the detection result.

Here, the top plate 711 and the base plate 712 according to an embodiment are made of magnetic material including iron, stainless steel, etc., and function as yoke boards. The top plate 711 and the base plate 712 are made of magnetic material, function as yoke boards. As a result, the top plate 711 and the base plate 712 form a magnetic circuit with the drive unit including the drive magnets 725 and the drive coils 726. With the above arrangement, the magnetic flux generated by the drive unit is concentrated in the top plate 711 and the base plate 712, and thus, the leakage to the outside from between the top plate 711 and the base plate 712 is reduced.

Therefore, influence from the magnetic fields generated by the drive unit including the drive magnets 725 and the drive coils 724 is reduced at the Hall elements 742 disposed on the heat sink 722 of the lower side surface of the base plate 712. Therefore, it is possible for the Hall elements 742 to output a signal in accordance with the change of the magnetic flux density of the position detection magnets 741 without being affected by the magnetic fields from the drive unit, and thus, it is possible for the drive control unit 12 to determine the position of the DMD 751 with high accuracy.

As described above, in the image generation unit 70 according to the second embodiment, influence from the drive unit to the Hall elements 742 is reduced and it is possible to detect the position of the DMD 751 with high accuracy.

It should be noted that the number, positions, etc., of the drive magnets 725 and the drive coils 726 as a drive unit may be different from those described in an embodiment as long as the movable unit 72 can be moved to any position. Further, the drive magnets 725 may be disposed on the base plate 712 and the drive coils 726 may be disposed on the base plate 712 side surface of the movable plate 721. The drive magnets 725 may be disposed on the movable plate 721 and the drive coils 726 may be disposed on the top plate 711 or the base plate 712.

Further, the position detection magnets 741 may be disposed on the heat sink 722 and the Hall elements 742 may be disposed on the heat sink 722 side surface of the base plate 712. Further, the drive unit including the drive magnets 725 and the drive coils 726 may be disposed between the base plate 712 and the heat sink 722, and the position detection unit including the position detection magnets 741 and the Hall elements 742 may be disposed between the top plate 711 and the base plate 712.

Further, the top plate 711 and the base plate 712 may be partially made of magnetic material as long as it is possible to reduce the leakage of the magnetic flux from the drive unit to the position detection unit. For example, the top plate 711 and the base plate 712 may be formed by laminating multiple members including a flat-plate-shaped member or a sheet-shaped member made of magnetic material. Further, the top plate 711 may be made of non-magnetic material as long as the base plate 712 is at least partially made of magnetic material and functions as a yoke board for preventing the leakage of the magnetic flux from the drive units to the position detection unit.

Third Embodiment

Next, a third embodiment will be described by referring to the drawings. It should be noted that the description of the same parts as the already described embodiments will be omitted.

Figure 23:
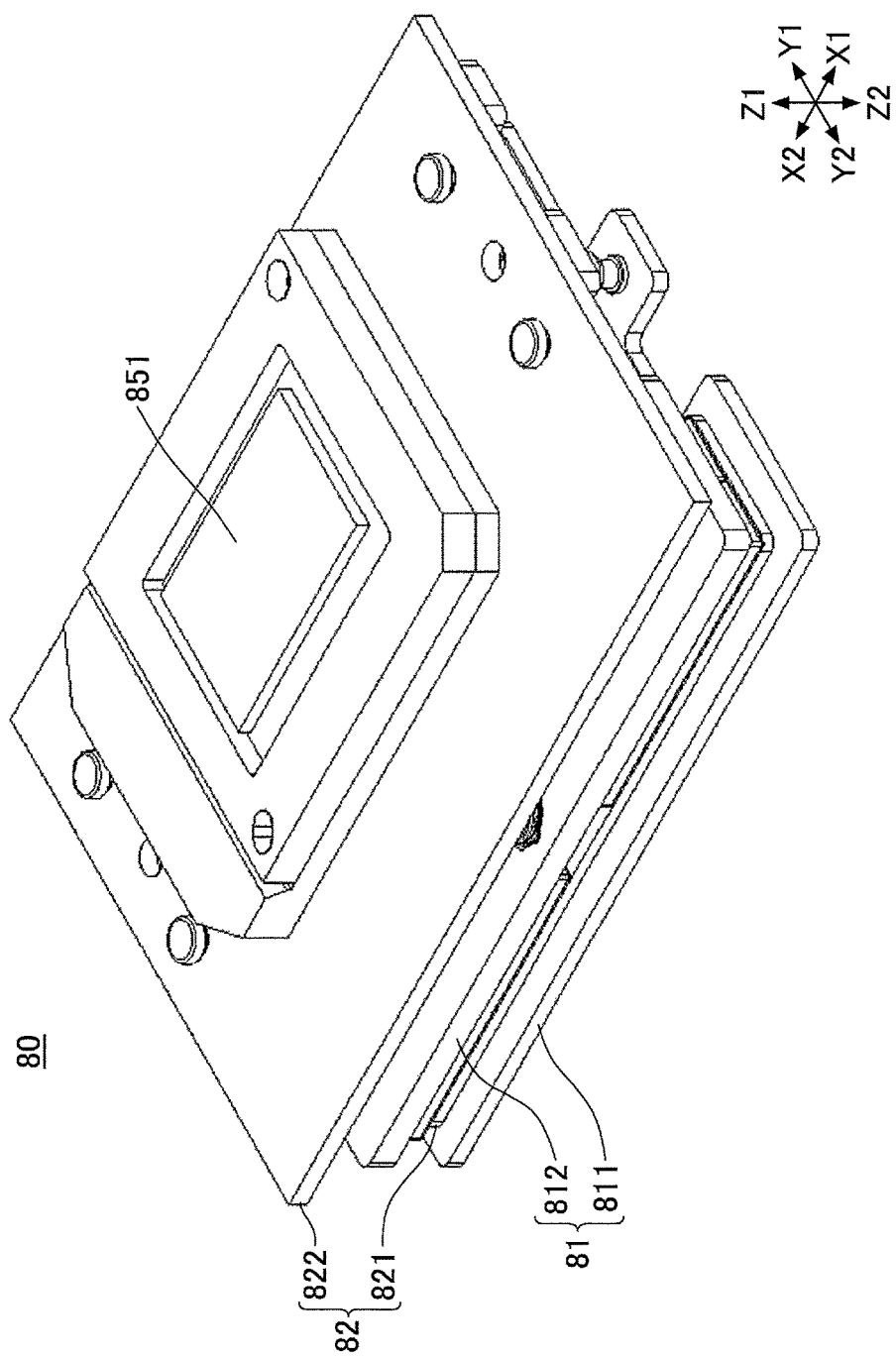
FIG. 23 is a perspective view illustrating an image generation unit according to a third embodiment.
Figure 24:
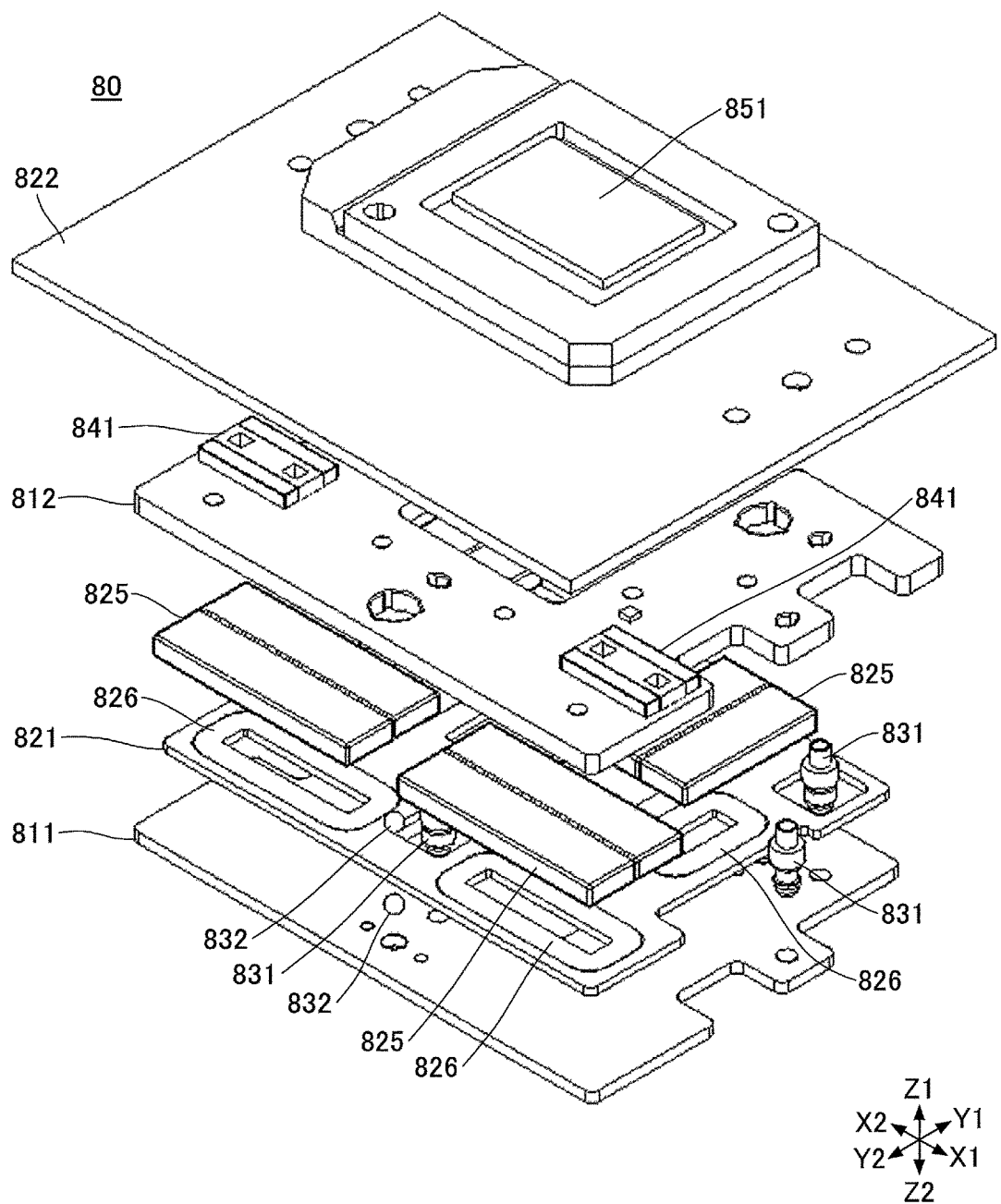
FIG. 24 is an exploded perspective view illustrating the image generation unit.

FIG. 23 is a perspective view illustrating an image generation unit 80 according to a third embodiment. FIG. 24 is an exploded perspective view illustrating the image generation unit 80. Further, FIG. 25 is an exploded side view illustrating the image generation unit 80. In an example illustrated in the figures, the image generation apparatus 80 is an image forming apparatus in which a DMD 851 is included in a movable apparatus. The DMD 851 is an example of an image generation unit.

As illustrated in FIG. 23, the image generation unit 80 includes a fixed unit 81 and a movable unit 82. The fixed unit 81 is fixed and supported by a lighting optical system unit 40 of the projector 1. The movable unit 82 is movably supported by the fixed unit 81. It should be noted that, for example, a heat sink as a heat sink unit for cooling the DMD 851 by releasing heat may be included in the movable unit 82.

As illustrated in FIG. 23 through FIG. 25, the fixed unit 81 includes a base plate 811 as a first fixed plate and a top plate 812 as a second fixed plate. The base plate 811 and the top plate 812 are linked in parallel with a predetermined space provided by a plurality of support posts 831.

As illustrated in FIG. 23 through FIG. 25, the movable unit 82 includes a movable plate 821 and a DMD substrate 822 as a movable part, and is movably supported by the fixed unit 81. The DMD substrate 822 includes the DMD 851.

The movable plate 821 is disposed between the base plate 811 and the top plate 812 of the fixed unit 81. The movable plate 821 is, similar to the first embodiment, movably supported by a plurality of support balls 832 that are rotatably held in the base plate 811 and the top plate 812.

The DMD substrate 822 is fixed to the movable plate 821. The top plate 812 of the fixed unit 81 is sandwiched between the DMD substrate 822 and the movable plate 821. The DMD 851 is disposed on the upper surface of the DMD substrate 822.

As illustrated in FIG. 24 and FIG. 25, a plurality of drive magnets 825 are disposed on the movable plate 821 side surface of the top plate 812. Further, as illustrated in FIG. 24, a plurality of drive coils 826 facing the corresponding drive magnets 825 are disposed on the top plate 812 side surface of the movable plate 821. The drive magnets 825 and the drive coils 826 form a drive unit for moving the movable plate 82.

When a current flows in the drive coils 826, a Lorentz force as a drive force for moving the movable unit 82 is generated due to the magnetic fields generated by the drive magnets 825. Upon receiving the Lorentz force generated between the drive magnets 825 and the drive coils 826, the movable unit 82 changes its position linearly or rotationally in a X-Y plane with respect to the fixed unit 81.

As illustrated in FIG. 24 and FIG. 25, position detection magnets 841 are arranged at multiple places on an upper side surface of the top plate 812. Further, a plurality of Hall elements 842 facing the corresponding position detection magnets 841 are arranged on a lower side surface of the DMD substrate 822.

The position detection magnets 841 and the Hall elements 842 form a position detection unit for detecting the position of the DMD 851. The Hall element 842 transmits a signal in accordance with a change of magnetic flux density of the position detection magnets 841 to the drive control unit 12 of the system control unit 10. The drive control unit 12 detects the position of the DMD 851 based on the signals transmitted from the Hall elements 842, and controls the drive unit to move the movable unit 82 based on the detection result.

Here, the base plate 811 and the top plate 812 according to an embodiment are made of magnetic material including iron, stainless steel, etc., function as yoke boards, and thus, form a magnetic circuit with the drive unit including the drive magnets 825 and the drive coils 826. With the above arrangement, the magnetic flux generated by the drive unit is concentrated in the base plate 811 and the top plate 812, and thus, the leakage to the outside from between the base plate 811 and the top plate 812 is reduced.

Therefore, influence from the magnetic fields generated by the drive unit including the drive magnets 825 and the drive coils 824 is reduced at the Hall elements 842 disposed on the DMD substrate 822 of the upper side surface of the top plate 812. Therefore, it is possible for the Hall elements 842 to output a signal in accordance with the change of the magnetic flux density of the position detection magnets 841 without being affected by the magnetic fields from the drive unit, and thus, it is possible for the drive control unit 12 to determine the position of the DMD 851 with high accuracy.

As described above, in the image generation unit 80 according to the third embodiment, influence from the drive unit to the Hall elements 842 is reduced and it is possible to detect the position of the DMD 851 with high accuracy.

It should be noted that the number, positions, etc., of the drive magnets 825 and the drive coils 826 as a drive unit may be different from those described in an embodiment as long as the movable unit 82 can be moved to any position. Further, the drive magnets 825 may be disposed on the base plate 811 and the drive coils 826 may be disposed on the base plate 811 side surface of the movable plate 821. Further, the drive magnets 825 may be disposed on the movable plate 821 and the drive coils 826 may be disposed on the base plate 811 or the top plate 812.

Further, the position detection magnets 841 may be disposed on the DMD substrate 822 and the Hall elements 842 may be disposed on the DMD substrate 822 side surface of the top plate 812. Further, the drive unit including the drive magnets 825 and the drive coils 826 may be disposed between the DMD substrate 822 and the top plate 812 and the position detection unit including the position detection magnets 841 and the Hall elements 842 may be disposed between the base plate 811 and the top plate 812.

Further, the base plate 811 and the top plate 812 may be partially made of magnetic material as long as it is possible to reduce the leakage of the magnetic flux from the drive unit to the position detection unit. For example, the base plate 811 and the top plate 812 may be formed by laminating multiple members including a flat-plate-shaped member or a sheet-shaped member made of magnetic material. Further, the base plate 811 may be made of non-magnetic material as long as the top plate 812 is at least partially made of magnetic material and functions as a yoke board for preventing the leakage of the magnetic flux from the drive unit to the position detection unit.

Modified Example

The movable apparatus may be configured as follows. For example, in the first embodiment, a plurality of position detection magnets 541, instead of the drive magnets 531, 532, 533, and 534, are arranged on the base plate 512 side surface of the top plate 511. On the other hand, a plurality of Hall elements 542, instead of the drive coils 581, 582, 583, and 584, are arranged on the top plate 511 side surface of the movable plate 552.

Further, the drive magnets 531, 532, 533, and 534, instead of a plurality of the position detection magnets 541, are disposed on the DMD substrate 557 side surface of the base plate 512. On the other hand, the drive coils 581, 582, 583, and 584, instead of a plurality of the Hall elements 542, are disposed on the base plate 512 side surface of the DMD substrate 557. The movable apparatus may be configured as described above.

Furthermore, in the second embodiment, a plurality of the position detection magnets 741, instead of the plurality of the drive magnets 725, are arranged on the base plate 712 side surface of the top plate 711. On the other hand, a plurality of the Hall elements 742, instead of the plurality of the drive coils 726, are arranged on the top plate 711 side surface of the movable plate 721.

Further, a plurality of the drive magnets 725, instead of a plurality of the position detection magnets 741, are disposed on the heat sink 722 side surface of the base plate 712. On the other hand, a plurality of the drive coils 726, instead of a plurality of the Hall elements 742, are disposed on the base plate 712 side surface of the heat sink 722. The movable apparatus may be configured as described above.

Furthermore, in the third embodiment, a plurality of the position detection magnets 841, instead of a plurality of the drive magnets 825, are arranged on the base plate 811 side surface of the top plate 812. On the other hand, a plurality of the Hall elements 842, instead of a plurality of the drive coils 826, are arranged on the top plate 812 side surface of the movable plate 821.

Further, a plurality of the drive magnets 825, instead of a plurality of the position detection magnets 841, are disposed on the DMD substrate 822 side surface of the top plate 812. On the other hand, a plurality of the drive coils 826, instead of a plurality of the Hall elements 842, are disposed on the base plate 811 side surface of the DMD substrate 822. The movable apparatus may be configured as described above.

Other than the above, in an embodiment, a pair of a drive force generation mechanism such as the drive magnet and the drive coil may be arranged in the opposite arrangement as described as long as they are arranged facing each other. The drive magnet and the drive coil are an example of a first pair.

Similarly, a pair of a position detection mechanism such as the position detection magnet and the Hall element may be arranged in the opposite arrangement as described as long as they are arranged facing each other. The position detection magnet and the Hall element are an example of a second pair.

Specifically, in the third embodiment, first, a plurality of the drive coils 826, instead of a plurality of the drive magnets 825, are arranged on the base plate 811 side surface of the top plate 812. On the other hand, a plurality of the drive magnets 825, instead of a plurality of the drive coils 826, are arranged on the top plate 812 side surface of the movable plate 821. Further, a plurality of the Hall elements 842, instead of a plurality of the position detection magnets 841, are disposed on the DMD substrate 822 side surface of the top plate 812. Furthermore, a plurality of the position detection magnets 841, instead of a plurality of the Hall elements 842, are disposed on the base plate 811 side surface of the DMD substrate 822.

In other words, the movable apparatus includes the first pair or the second pair between the second fixed plate and the movable part. Further, the movable apparatus includes a pair between the movable plate and the fixed unit which pair is different from the pair included between the second fixed plate and the movable part.

Specifically, in the case where the position detection magnets are disposed on the second fixed plate, magnetic sensors are disposed on the movable part facing the corresponding position detection magnets. In this way, first, the second pair is disposed between the second fixed plate and the movable part. Next, drive magnets are disposed on the first fixed plate. Next, drive coils are disposed on the movable plate facing the corresponding drive magnets. In this way, the first pair is disposed between the movable plate and the fixed unit.

Further, in the case where the second pair is disposed between the second fixed plate and the movable part, the first pair may be disposed between the movable plate and the second fixed plate. Specifically, drive coils are disposed on the movable plate. Next, drive magnets are disposed on the second fixed plate.

On the other hand, the first pair may be disposed between the second fixed plate and the movable part. In this case, the second pair is disposed between the first fixed plate and the movable plate, or between the movable plate and the second fixed plate.

As described above, a movable apparatus, an image projection system, an image generation apparatus, and an image projection apparatus according to an embodiment have been described. An embodiment is not limited to the above, and various types of modifications and refinements are available within a scope of the present invention.

The present invention is not limited to the specifically disclosed embodiments, and variations and modifications may be made without departing from the scope of the present invention.

The present application is based on and claims the benefit of priority of Japanese Priority Application No. 2015-254451 filed on Dec. 25, 2015 and Japanese Priority Application No. 2016-206942 filed on Oct. 21, 2016, the entire contents of which are hereby incorporated herein by reference.

What is claimed is:

1. A movable apparatus comprising:
a fixed unit including a first fixed plate and a second fixed plate, the second fixed plate being made of magnetic material;
a movable unit including a movable plate movably supported between the first fixed plate and the second fixed plate and a movable part fixed to the movable plate, the second fixed plate being sandwiched between the movable part and the movable plate;
a first pair configured to form a drive force generation mechanism; and
a second pair configured to form a position detection mechanism,
the second pair is arranged facing each other in the fixed unit and in the movable plate, and
the first pair is arranged facing each other in the fixed unit and in the movable part,
wherein the movable part and the movable plate move together as the movable unit.

2. The movable apparatus according to claim 1, wherein
the first pair is disposed between the first fixed plate and the movable plate or between the movable plate and the second fixed plate, and
the second pair is disposed between the second fixed plate and the movable part.

3. The movable apparatus according to claim 2, wherein
the second pair is a position detection magnet and a magnetic sensor,
the position detection magnet is disposed on the second fixed plate, and
the magnetic sensor is disposed on the movable part.

4. The movable apparatus according to claim 2, wherein
the first pair is a drive magnet and a drive coil,
the drive magnet is disposed on the first fixed plate or the second fixed plate, and
the drive coil is disposed on the movable plate.

5. The movable apparatus according to claim 2, wherein the first fixed plate is at least partially made of magnetic material.

6. The movable apparatus according to claim 1, wherein
the second pair is disposed between the first fixed plate and the movable plate or between the movable plate and the second fixed plate, and
the first pair is disposed between the second fixed plate and the movable part.

7. An image generation apparatus comprising:
the movable apparatus according to claim 1; and
an image generation unit included in the movable unit.

8. The image generation apparatus according to claim 7, wherein the movable part includes a heat sink unit for releasing heat of the image generation unit.

9. An image projection apparatus comprising:
the image generation apparatus according to claim 7; and
a projection unit configured to project an image generated by the image generation apparatus.

10. The movable apparatus according to claim 1, wherein the movable part moves in a same direction as the movable plate moves.

11. The movable apparatus according to claim 1, wherein the movable part moves in a direction parallel to the first fixed plate.

* * * * *